United States Patent
Rinne et al.

(10) Patent No.: US 8,572,250 B2
(45) Date of Patent: *Oct. 29, 2013

(54) DISCONTINUOUS TRANSMISSION/RECEPTION IN A COMMUNICATIONS SYSTEM

(75) Inventors: Mika P. Rinne, Espoo (FI); Olav Tirkkonen, Helsinki (FI)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/885,167

(22) PCT Filed: Feb. 24, 2006

(86) PCT No.: PCT/IB2006/001474
§ 371 (c)(1),
(2), (4) Date: Aug. 10, 2009

(87) PCT Pub. No.: WO2006/114710
PCT Pub. Date: Nov. 2, 2006

(65) Prior Publication Data
US 2009/0305711 A1    Dec. 10, 2009

(51) Int. Cl.
*G06F 15/173* (2006.01)
(52) U.S. Cl.
USPC ........... 709/226; 709/228; 370/252; 713/320; 455/418
(58) Field of Classification Search
USPC .......... 709/223–230; 370/230, 311, 278, 335, 370/328, 252–253; 340/7.32–7.34; 455/343.1–343.4, 450
See application file for complete search history.

(56) References Cited

U.S. PATENT DOCUMENTS

| | | | |
|---|---|---|---|
| 5,140,698 A | 8/1992 | Toko | |
| 5,826,173 A | 10/1998 | Dent | |
| 6,094,425 A | 7/2000 | Auger et al. | |
| 6,337,990 B1 | 1/2002 | Koshino | |
| 6,463,055 B1 | 10/2002 | Lupien et al. | |
| 6,466,795 B1 | 10/2002 | Ahn | |
| 6,480,476 B1 | 11/2002 | Willars | |
| 6,714,515 B1 | 3/2004 | Marchand | |
| 6,724,813 B1 | 4/2004 | Jamal et al. | |
| 6,731,948 B1 | 5/2004 | Lee et al. | |
| 7,269,145 B2 | 9/2007 | Koo et al. | |
| 7,379,863 B2* | 5/2008 | Delfs et al. | 704/201 |
| 7,512,104 B2* | 3/2009 | Bjelland et al. | 370/338 |
| 7,680,058 B2* | 3/2010 | Seurre et al. | 370/252 |

(Continued)

FOREIGN PATENT DOCUMENTS

EP    1 484 873    8/2004

OTHER PUBLICATIONS

Chinese Office Action application No. 200680011601.6 dated Aug. 10, 2010.

*Primary Examiner* — Greg C Bengzon

(57) ABSTRACT

Allocation information is transmitted in a communications system in accordance with at least one allocation rule for indicating allocation of sets of transmission resources to communications devices. The at least one allocation rule is defined for associating sequences of sets of transmission resources with communications devices, and a communications device monitors allocation information of sets of transmission resources associated with it. Communications devices are informed of their respective allocation rules. Transmission resources for the communications devices are allocated based at least on said allocation rules.

13 Claims, 23 Drawing Sheets

(56) References Cited

U.S. PATENT DOCUMENTS

| | | |
|---|---|---|
| 8,014,782 B2 * | 9/2011 | Granzow et al. ............. 455/450 |
| 2002/0105940 A1 | 8/2002 | Forssell et al. |
| 2003/0048765 A1 * | 3/2003 | Jang ............................. 370/337 |
| 2003/0086379 A1 | 5/2003 | Terry et al. |
| 2003/0086381 A1 | 5/2003 | Terry et al. |
| 2004/0125784 A1 | 7/2004 | Lee et al. |
| 2005/0066034 A1 | 3/2005 | Beckmann et al. |
| 2005/0117536 A1 * | 6/2005 | Cho et al. ...................... 370/328 |
| 2005/0250497 A1 * | 11/2005 | Ghosh et al. .................. 455/436 |
| 2005/0268118 A1 | 12/2005 | Zebelloni et al. |
| 2006/0046733 A1 * | 3/2006 | Fauconnier et al. .......... 455/450 |
| 2006/0083168 A1 * | 4/2006 | Prakash ........................ 370/230 |
| 2008/0043656 A1 | 2/2008 | Yoon et al. |

* cited by examiner

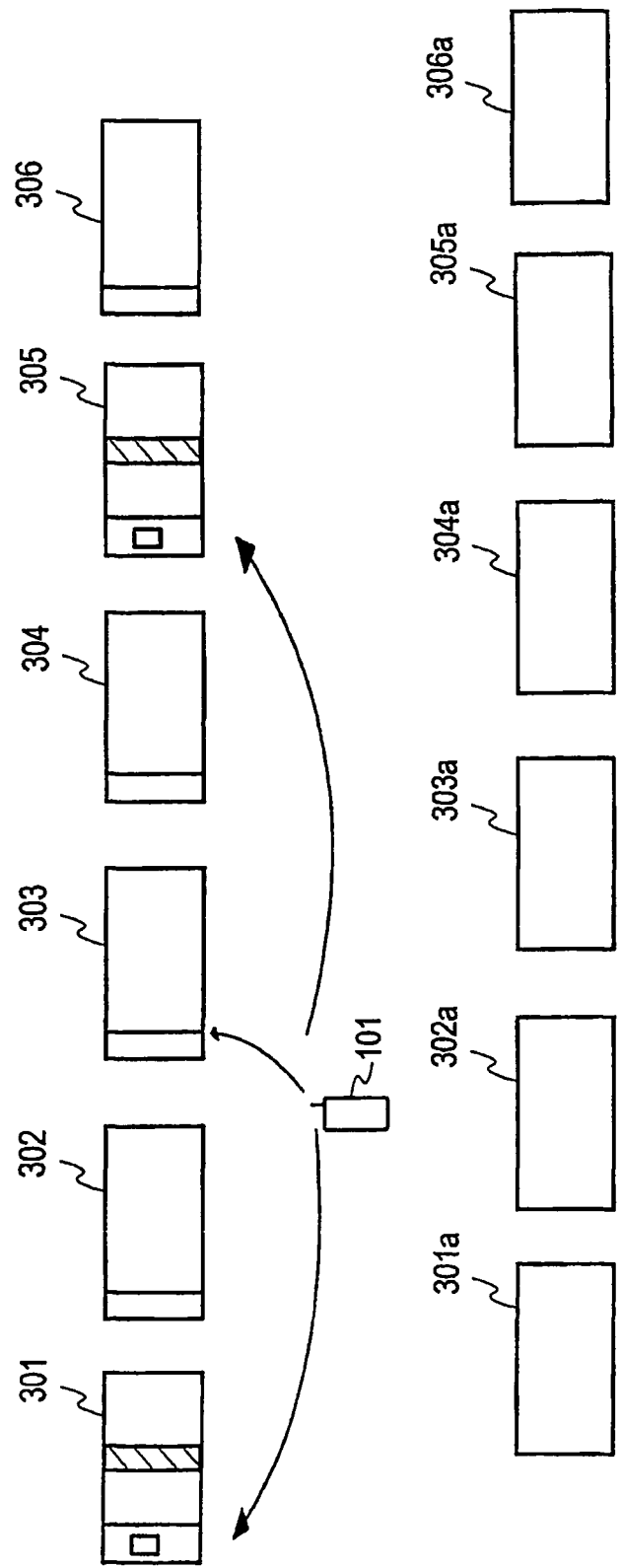

| Header | payload | eHdr | pointer to the next continuum [SFN] |
|--------|---------|------|-------------------------------------|
|        |         | eHdr | SFN %n rule in the next continuum [SFN] |

Table 1.

| UE Id | RL ID | Short term rules | Long term rules | | Next continuum |
|---|---|---|---|---|---|
| 1 | | Rule | NA | TTI = NA | NA |
| 2 | | rule | rule | TTI = NA | NA |
| 3 | | rule | rule1 rule2 | TTI 1= x1 TTI 2=x2 | NA |
| 4 | | | | | |
| 5 | | | | | |
| | | | | | |

Fig. 8a

Table 2.

| UE Id | RL ID | Short term rule | Long term rule | | Next continuum |
|---|---|---|---|---|---|
| 1 | 102 | SFN % 4 Offset {2} | Decode correctly ⇨ skip SFN + TTI decode incorrectly ⇨ follow short term rule | TTI = 20 ms or (TTI =SFN+30) | NA |
| 2 | 41 | SFN % 16 Offset {5} | Decode correctly ⇨ skip SFN + TTI decode incorrectly ⇨ SFN % 4 offset {2} | TTI = 40 ms (or TTI = SFN+60) | NA |
| 3 | 743 | NA | NA | | SFN+100 |
| 4 | | | | | |
| 5 | | | | | |
| | | | | | |

Fig. 8b

Table 3.

| BS Id | RL ID | Short term rule | Long term rule | | Next continuum |
|---|---|---|---|---|---|
| 1 | 102 | SFN % 4 Offset {2} | Decode correctly ⇨ skip SFN + TTI decode incorrectly ⇨ follow short term rule | TTI = 20 ms or (TTI =SFN+30) | NA |
| 2 | NA | NA | NA | NA | NA |

Fig. 8c

Table 4.

| BS Id | RL ID | Short term rule | Long term rule | | Next continuum |
|---|---|---|---|---|---|
| 1 | 41 | SFN % 16 Offset {5} | Decode correctly ⇨ skip SFN + TTI decode incorrectly ⇨ SFN % 4 offset {2} | TTI = 40 ms (or TTI = SFN+60) | NA |
| 2 | NA | NA | NA | NA | NA |
| | | | | | |
| | | | | | |

Fig. 8d

Table 5.

| BS Id | RL ID | Short term rule | Long term rule | | Next continuum |
|---|---|---|---|---|---|
| 1 | 41 | SFN % 16 Offset {5} | Decode correctly ⇨ skip SFN + TTI decode incorrectly ⇨ SFN % 4 offset {2} | TTI = 40 ms (or TTI = SFN+60) | NA |
| 2 | 657 | SFN % 16 Offset {5} | Decode correctly ⇨ skip SFN + TTI decode incorrectly ⇨ SFN % 4 offset {2} | TTI = 40 ms (or TTI = SFN+60) | NA |
| | | | | | |
| | | | | | |

Fig. 8e

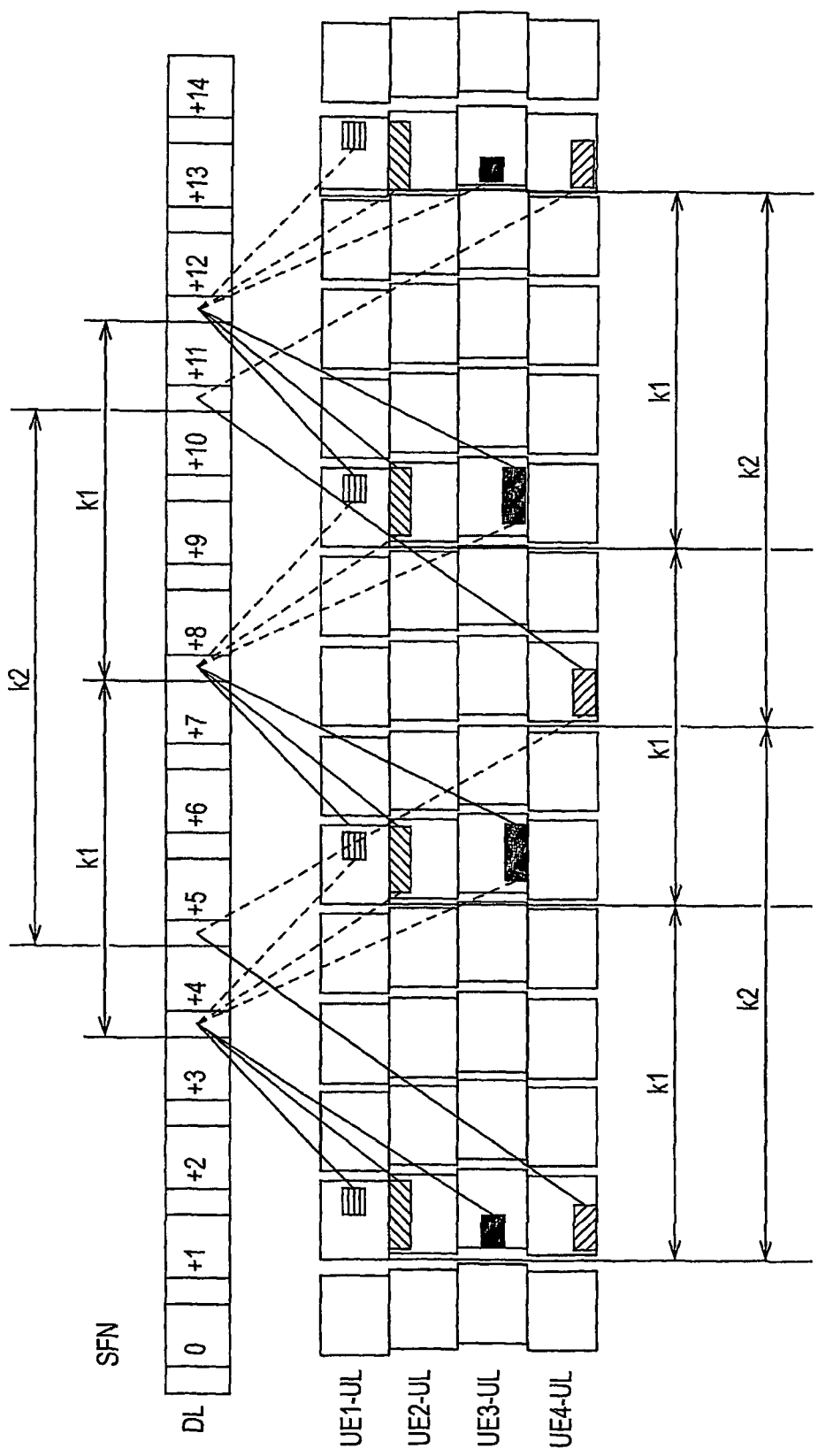

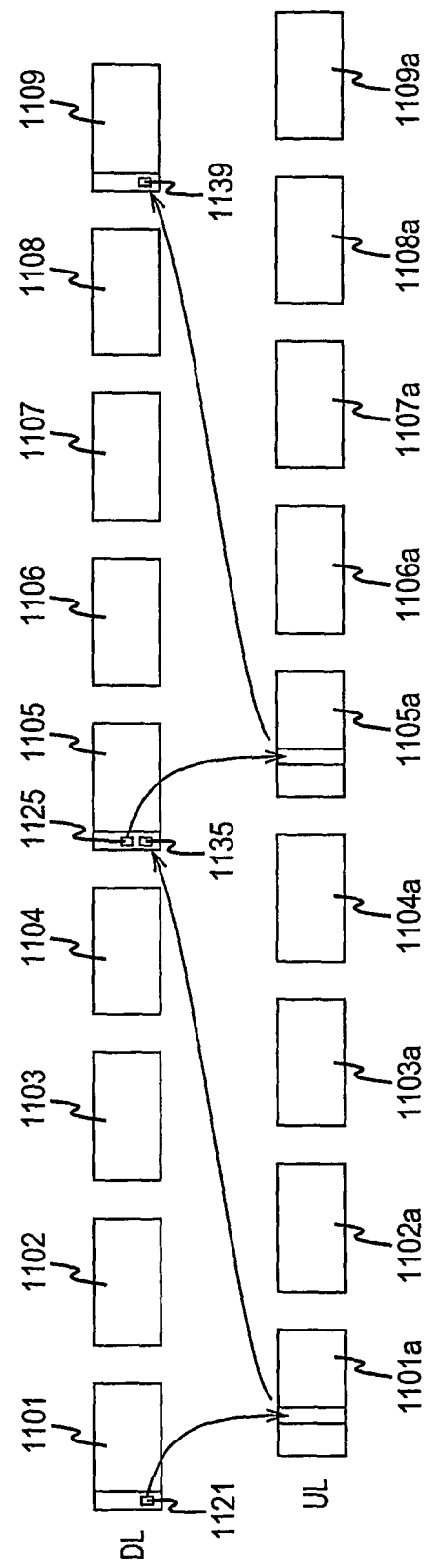

DISCONTINUOUS TRANSMISSION/RECEPTION IN A COMMUNICATIONS SYSTEM

BACKGROUND OF THE INVENTION

1. Field of the Invention

The present invention relates to transmission of data in a communications system. In particular the present invention relates to discontinuous transmission/reception of data in a communications system.

2. Description of the Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for user equipment are known. Cellular communication systems are configured to have a cell structure, and typically they support communication with user equipment changing locations (mobile users). The support for communications for mobile users may include support for handing existing connections from one cell to another cell. At least routing of calls or communications for a mobile user in a new cell is typically supported in cellular systems. Some examples of a cellular system are the Global System for Mobile Telecommunications (GSM) and General Packet Radio Service (GPRS). GPRS provides packet-switched data services and utilizes the infrastructure of a GSM system. Further examples of a cellular system are third generation telecommunication systems, which support both packet-switched and circuit-switched transfer. The Wideband Code Division Multiple Access (WCDMA) system is one example of a third generation cellular telecommunication system.

Traditionally communications systems have been circuit-switched systems, where a certain amount of resources is reserved for a connection/call continuously irrespective of the need of transmitting data at a particular moment in time. The reserved amount of resources may be, for example, a dedicated channel. The channel, in turn, may be defined for example by a certain slot in successive time frames in a time division multiplex system, a certain frequency in a frequency division multiplex system or a certain channelization code in a code division multiplex system.

In this allocation scheme, resources that are announced to a given communications device are occupied and are not available to any other communications devices, before the allocation is released. The resource occupation is maintained, even if the given communications device has actually no data to transmit or to receive. For allocating transmission resources in a more efficient way, it is possible to take into account the actual need for transmission capacity when allocating transmission resources. For time-critical data (for example, a voice call) resources may be allocated on a continuous basis, but less time critical data may be buffered until there are free transmission resources. In the novel communication systems the available bandwidth and symbol rate is huge compared to the traditional ones. Thus, any fixed reservation of resources, which are actually not in use, will cause unnecessary loss of efficiency.

In novel communication systems, due to their inherent large transmission capacity, it is possible to share the communication medium efficiently among many communications devices. The communications devices typically monitor the shared medium for transmitting and receiving information most efficiently. The communications systems work by random access and collision detection or alternatively the allocation of resources is given in an explicit way by signalling.

When transmitting information on a shared medium, the communications devices typically need to know exactly which pieces of information are intended for them to receive and which pieces of transmission resources are intended for them to transmit. This is typically done by exchanging explicit allocation information between the communications system and the communications devices. The allocation information may be transmitted on a shared signalling channel or using an associated signalling channel. High Speed Downlink Packet Access in the WCDMA system, for example, uses a high-capacity shared data channel for downlink data transfer and a low-capacity shared signalling channel for informing the communications devices about the specific resource allocations on the shared data channel. In a Wireless Local Area Network, each data packet header contains identifiers of the communications device to indicate which device this data packet is addressed to and which device needs to decode it. Thus, all communications devices need to monitor and process the headers of all data packets for being able to receive data addressed to it.

When a communications device is listening to a shared medium, it needs to monitor allocation information continuously or at least very frequently for every transmission unit for determining whether it should receive data in the downlink direction or whether it could transmit data in the uplink direction. Thus allocation information needs to be monitored continuously at least once per transmission unit, although the actual data transmission and/or reception occurs in a discontinuous manner. Continuous monitoring and decoding of potential presence of allocation information consumes power. Especially for wireless communications devices, power consumption is a critical factor.

Embodiments of this invention aim to provide an efficient solution for discontinuous transmission and/or reception.

SUMMARY OF THE INVENTION

In accordance with an embodiment, there is provided a method of allocating resources in a communications system to at least one communications device, the method comprising:
  defining at least one allocation rule for associating at least one sequence of sets of transmission resources with at least one communications device, the at least one communications device being configured to monitor allocation information in accordance with a set of allocation rules associated with the respective communications device;
  informing the at least one communications device of the at least one allocation rule;
  transmitting allocation information in accordance with the at least one allocation rule for indicating allocation of sets of transmission resources; and
  allocating transmission resources for the at least one communications device based at least on the at least one allocation rule.

In accordance with another embodiment, there is provided a method of operating a communications device, the method comprising:
  determining at least one allocation rule for the communications device, the at least one allocation rule defining a sequence of sets of transmission resources associated with the communications device;

monitoring allocation information in accordance with the at least one allocation rule; and determining whether the sequence of sets of transmission resources contains transmission resources allocated for the communications device based on the allocation information of the sequence of sets of transmission resources.

In accordance with an embodiment, there is provided a communications system that is configured to define at least one allocation rule for associating at least one sequence of sets of transmission resources with at least one communications device, the at least one communications device being configured to monitor allocation information in accordance with a set of allocation rules associated with the respective communications device, to inform the at least one communications device of the at least one allocation rule, to transmit allocation information in accordance with the at least one allocation rule for indicating allocation of sets of transmission resources, and to allocate transmission resources for the at least one communications device based at least on the at least one allocation rule.

In accordance with an embodiment, there is provided a transceiver network element that is configured to define at least one allocation rule for associating at least one sequence of sets of transmission resources with at least one communications device, the at least one communications device being configured to monitoring allocation information in accordance with a set of allocation rules associated with the respective communications device, to inform the at least one communications device of the at least one allocation rule, to transmit allocation information in accordance with the at least one allocation rule for indicating allocation of sets of transmission resources, and to allocate transmission resources for the at least one communications device based at least on the at least one allocation rule.

In accordance with a yet further embodiment, there is provided a communications device that is configured to determine at least one allocation rule for the communications device, the at least one allocation rule defining a sequence of sets of transmission resources associated with the communications device, monitor allocation information in accordance with the at least one allocation rule, and determine whether the sequence of sets of transmission resources contains transmission resources allocated for the communications device based on the allocation information of the sequence of sets of transmission resources.

There is also provided a communications device and a computer program in accordance with this even further embodiment of the invention.

Dependent claims define more specific embodiments.

BRIEF DESCRIPTION OF THE DRAWINGS

Embodiments of the present invention will now be described by way of example only with reference to the accompanying drawings, in which:

FIG. 3a shows schematically a first allocation rule example;

FIG. 8a shows Table 1, which is an example of a base station table for allocations;

FIG. 8b shows Table 2, which is a further example of a base station table for allocation;

FIG. 8c shows Table 3, which is an example of a terminal table for allocation relating to Table 2 of the base station;

FIG. 8d shows Table 4, which is a further example of a terminal table for allocation relating to Table 2 of the base station;

FIG. 8e shows Table 5, which is an example of an allocation table of a terminal having connections to more than one base station;

FIG. 10b shows schematically a second example, where a piece of allocation information may be associated with more than one set of uplink transmission resources;

FIG. 11 shows schematically an example of transmitting uplink acknowledgement information in accordance with an allocation rule associated with the uplink transmissions;

DETAILED DESCRIPTION OF EMBODIMENTS

In the following description, discontinuous transmission and/or reception means that the communication device need not stay active in decoding information that is not assigned for it, but can pause for periods of in-activity and can wake-up for periods of activity in an efficient way. The communication network rarely has this opportunity, but it plays a significant role to negotiate and arrange such discontinuous transmission and reception opportunities for the communication devices.

Embodiments of the invention may be applied in connection with a communication medium shared among a set of communications devices. For example, a shared channel in a communications system may use an embodiment of the invention, where other channels employ different allocation schemes. As a second example, all information transmission in a communications system may be designed to operate in accordance with embodiments of the invention.

Figure 1:
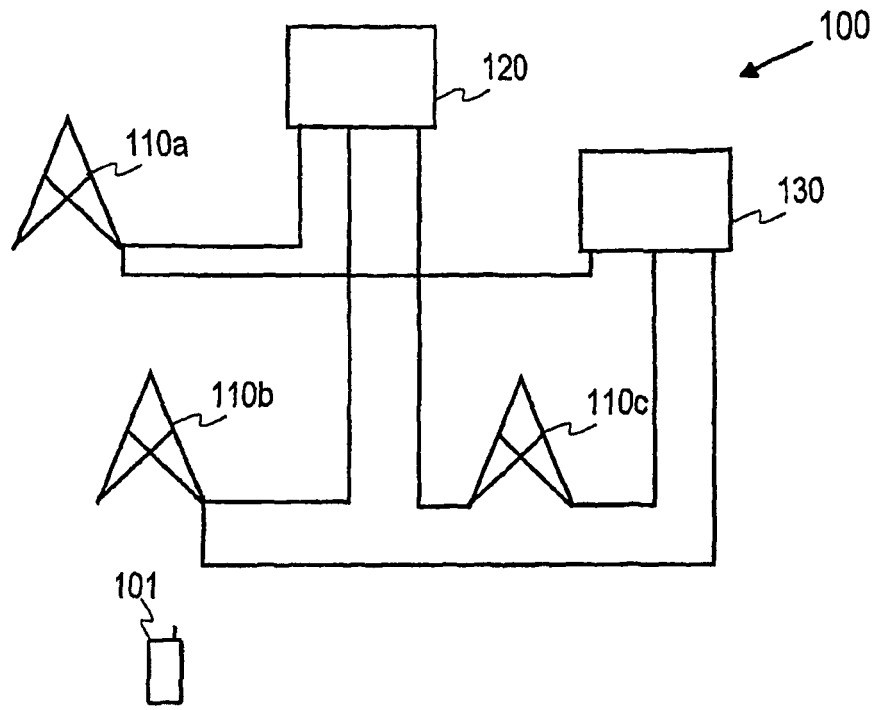
FIG. 1 shows, as an example, a communications system where embodiments of the inventions are applicable.

FIG. 1 shows, as an example, a communications system 100 where embodiments of the invention are applicable. The communications system 100 contains a plurality of transceiver network elements 110a, 110b and 110c. In some communications systems, these transceiver network elements may be called base stations or access points. Each base station may contain one or more sectors, each sector forming a communication cell. The communications system 100 may further contain a controller network element 120 responsible for controlling transmission resources. As an alternative, the control functionality may be implemented in a distributed manner in the transceiver network elements 110. The communication system may further contain a router 130, responsible for packet-switched transport functionality. The router 130 typically provides access to further routers and packet-data networks.

A communications device 101 communicates with the communication system 100 by receiving information transmitted by one or more than one transceiver network element 110 and by transmitting information to the communications system. It is possible that the signal transmitted by the communications device 101 is received and processed by one or more transceiver network element 110. It is also possible that the signal transmitted by a transceiver 110 of a communications system, is received by one or more communications device 101.

Embodiments of the invention do not set any specific requirements on the multiplexing or modulation techniques used in the communications system 100. The communications system 100 may employ any suitable combination of multiplex techniques. The term transmission resources in this description refers to any set of transmission resources that can be divided between a set of communications devices. For example, communications devices 101 may be multiplexed using frequency and/or time and/or code division techniques. Communications devices may use frequency division, time division, or code division techniques or any set of their combinations. Non-orthogonal multiplexing may also be used, where multiple users share the same orthogonal transmission resource, for example space-division or dirty paper coding techniques. The communications system 100 may employ any modulation technique, including multicarrier modulation, compatible with the multiplexing techniques used in the communications system 100.

In embodiments of the invention, information is transmitted using a series of sets of transmission resources. A set of transmission resources may be, for example, a radio frame, a composition of frames (a superframe), a set of slots or symbols in a frame, or data blocks on a shared medium. Allocation of transmission resources within a set of transmission resources is defined by allocation information associated with the set of transmission resources. This allocation information is often referred to as an allocation table, and allocation information is called AllocationTable below in connection with the second embodiment. Allocation information of a set of transmission resources contains at least identifiers associated with those communications devices to which transmission resources are allocated in the set. By monitoring this allocation information a communications device may determine whether the set of transmission resources contains a resource allocated for this communications device. Typically allocation information contains also information indicating which part of the set of transmission resources is allocated to a communications device indicated in the allocation information. Alternatively, this information may be implicit, for example, based on the order of identifiers in the allocation information. For example, if a set of transmission resources is allocated in fixed-sized chunks, the order of the identifiers unambiguously defines the resource allocation of a set of transmission resources. Allocation information may further contain various other details, as the order and size of the allocated resources, as discussed below. A set of transmission resources may be allocated to a single communications device, or the transmission resources of a set may be allocated among a plurality of communications devices.

It is appreciated that alternatively to being associated with a single communications device, an identifier in an allocation table (or other allocation information) may be associated with a group of communications devices. Group allocation allows a common indication of resource allocation for more than one communications device at a time. The group of communications devices are given a same group allocation rule, and communications devices of the group monitor the same allocation information and the same sets of transmission resources. A communications device may have allocation rule(s) associated with its specific identifier and/or group allocation rule(s) associated with a group identifier. It is possible that, especially in the down direction, the transmission resources associated with a group allocation identifier are common to the group; in other words, all communications devices of the group receive the same information. Alternatively, it is possible to separately inform the communications devices of the group (for example, when setting up an allocation group) how resources, whose allocation is notified by a group identifier, are allocated among the group of communications device. The group allocation identifier is advantageous, for example, for transmission of small amounts of rare data, which is easy to align similarly for a group of communications devices. Such examples could be data cast of similar data for a user group, personalized group messages, personalized info delivery, or personalized messages.

It is appreciated that a piece of allocation information associated with a set of downlink transmission resources may specify allocation of that set of downlink transmission resources only.

It is appreciated that a piece of allocation information associated with a set of uplink transmission resources may specify allocation of that set of uplink transmission resources only.

Alternatively, a piece of allocation information associated with a set of downlink transmission resources may specify allocation of that set of downlink transmission resources and allocation of a set of uplink transmission resources. If the allocation of uplink and downlink transmission resources is the same, the allocation information need not specify the direction of the allocated transmission resources. If the allocations of uplink and downlink transmission resources are independent, the allocation information specifies separately allocation for the set of downlink transmission resources and for the set of uplink transmission resources. This can be done, for example, by having two separate allocation tables, one for downlink another for uplink, or by having link direction indicators in a single allocation table.

In embodiments of the invention, at least one allocation rule is defined for a communications device that wishes to transmit or receive information in a discontinuous manner. An allocation rule defines typically a sequence of sets of transmission resources, which may contain transmission resources allocated for a given communications device. The communications device thus need to monitor allocation information of the sets of transmission resources defined by its allocation rule(s) only, and the communications device need not decode allocation information of resources of all sets of transmission resources, intended for other communications devices respectively. If the allocation information of a given set of transmission resource indicates that this set contains a transmission resource allocated for this communications device, the communications device typically receives and/or transmits information using this allocated transmission resource.

By defining at least one allocation rule for a communications device and by allocating transmission resources in accordance with the allocation rules, a communications device knows when is the next instant in time that it may receive/transmit information in a discontinuous manner. The communications device need not monitor allocation information continuously to find out when transmission resources are next allocated to it. This reduces power consumption. Depending on the information transfer need, different allocation rules may be defined. Some examples of allocation rules are discussed in more detail below.

The communications system, on the other hand, may decide about the actual allocation of resources based on the allocation rules and various other factors. This means that for each communications device there are certain sets of transmission resources, which potentially contain transmission resources allocated to that communications device. Depending, for example, on the need to allocate transmission resources to the communications device and on the transmission load, the communications system then allocates transmission resources for a communications device among the sets of transmission resources potentially containing transmission resources for this communications device.

It is appreciated that even if every resource allocation in subsequent sets of transmission resources is independent, the allocation information does not appear in an independent way, but the allocation information is favorably linked to consequent allocation indications by defined allocation rules. From the system point of view, it may be advantageous to arrange communications devices so that each follows its favorable allocation rules for potential decoding of allocation indications, instead of decoding all allocation indications. This is discussed in more detail below in connection with FIGS. 5a to 5e.

Figure 2B:
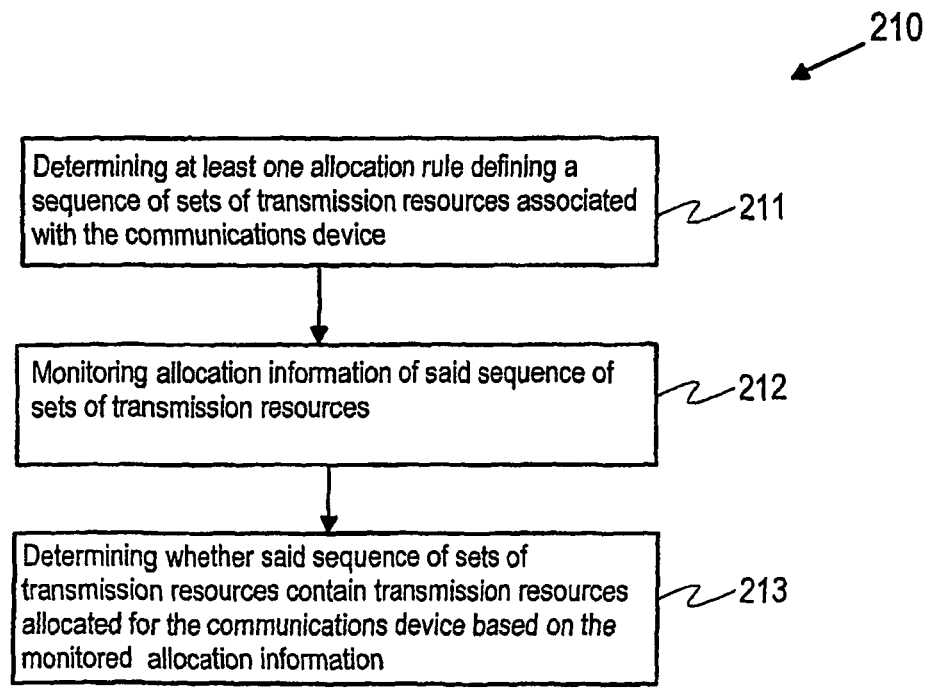
FIG. 2b shows, as an example, a flowchart of a method of operating a communications device in accordance with the first embodiment of the invention.
Figure 2A:
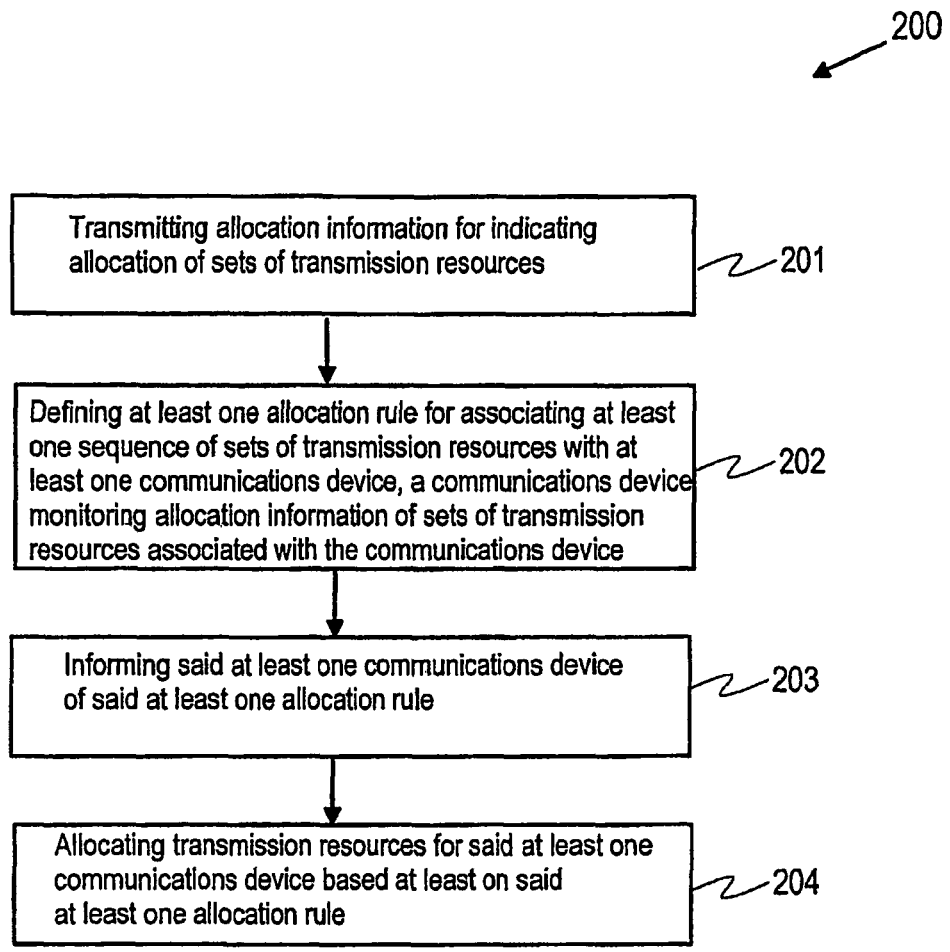
FIG. 2a shows, as an example, a flowchart of a method in accordance with a first embodiment of the invention.

FIG. 2a shows a flowchart of a method 200 in accordance with a first embodiment of the invention. The method 200 relates to allocation of transmission resource to communications device and how to indicate the allocated transmission resources to the communications device. As discussed above, allocation of a set of transmission resources is indicated to communications devices with allocation information associated with said set of transmission resources (step 201). This allocation information may be, for example, an allocation table transmitted in the beginning of a frame. Typically allocation information of a set of transmission resources in the downlink direction is transmitted together with information carried by the set of transmission resources. Allocation information of uplink set of transmission resources may be transmitted, for example, in connection with a corresponding set of transmission resources in the downlink direction or separately at time instants defined for the uplink sets of transmission resources. In step 202, at least one allocation rule is defined for a communications device. The allocation rule associates typically a sequence of sets of transmission resources with the communications device. This sequence of sets of transmission resources may contain transmission resources allocated for the communications device. As discussed above, a communications device monitors allocation information of those sets of transmission resources defined by its allocation rule(s). In step 203, the communications devices are informed about their respective allocation rules. The communications devices need not know allocation rules of other communications devices. The communications device may receive information explicitly defining an allocation rule. As a further example, there may be a set of default allocation rules, and the communications device receives an identifier associated with a default allocation rule. Transmission resources are allocated for communications devices based at least one of their allocation rules in step 204.

FIG. 2b shows a flowchart of a method 210 of operating a communications device in accordance with the first embodiment of the invention. In step 211 at least one allocation rule defining a sequence of sets of transmission resources associated with the communications device is determined. Typically, the communications system sends to the communications device information about its allocation rule(s). A communications device may propose a suitable set of allocation rules for itself, and the communications system may then confirm which set of allocation rules will be in use. As a second example, the communications system may propose some sets of rules to the communications device, which then selects the most appropriate rule(s). The second embodiment below discusses this in more detail. In step 212, the communications device monitors allocation information of said at least one set of transmission resources defined by its allocation rule(s). In step 213 the communications device determines, based on the monitored allocation information, whether said sequence of sets of transmission resources contains transmission resources allocated for the communications device.

Figure 3B:
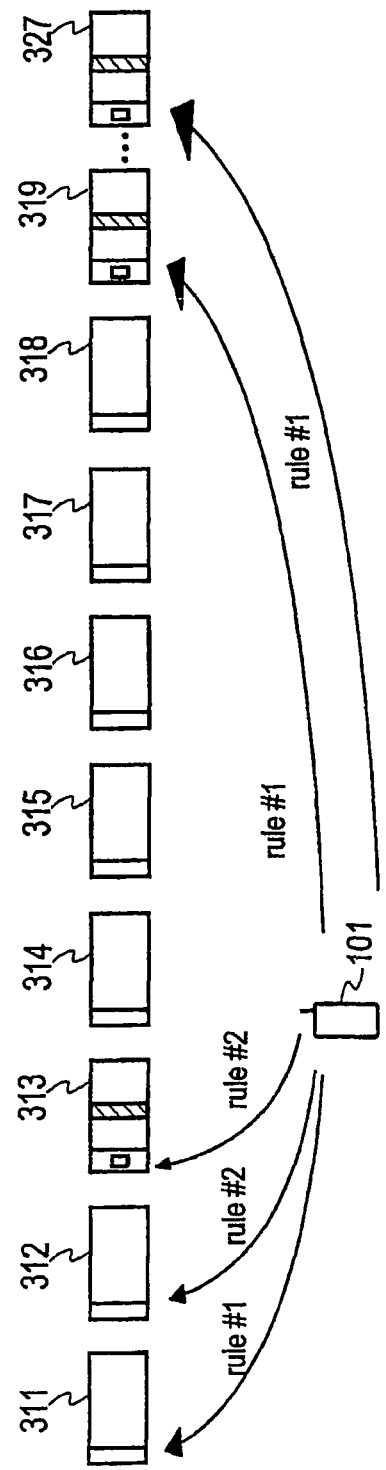
FIG. 3b shows schematically a second allocation rule example.
Figure 3C:
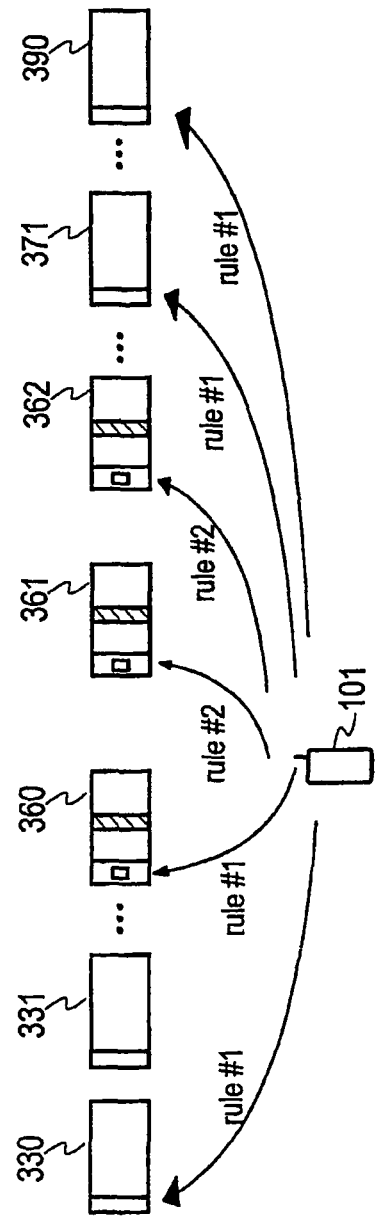
FIG. 3c shows schematically a third allocation rule example.

FIGS. 3a, 3b and 3c show schematically some examples of allocation rules using radio frames as an example. In FIG. 3a, a communications device 101 has an allocation rule defining that the communications device 101 monitors allocation information in frames periodically. The period may be defined as a number of frames or as a time period, which ever is more suitable. In FIG. 3a, the communications device 101 monitors allocation information of every other frame 301,

303, 305 by the way of example. The communications device 101 may completely ignore allocation information in frames 302, 304 and 306, because it knows that these frames cannot contain transmission resources allocated for it. In FIG. 3a, allocation information of frames 301 and 305 indicates an identifier associated with the communication device 101. Allocation information in these frames also tells to the communications device 101 which transmission resources in the frames are allocated for the communications device 101 (hatched part of frames 301 and 305). Accordingly, the communication device 101 can receive information correctly. In FIG. 3a, allocation information in frame 303 does not include an identifier associated with the communications device 101, which means there were no actual resources allocated for communications device 101 in this frame.

It is appreciated that the allocation information may alternatively or additionally relate to uplink frames. In this case, the communication device 101 would transmit information using the transmission resources allocated to it.

A periodic allocation rule may define a sequence of sets of transmission resources using a time period or, for example, a number of sets of transmission resources. When a set of transmission resources is a frame, a periodic allocation rule may use a System Frame Number (SFN). The communications device can typically keep track of the system frame number without receiving all frames, and therefore SFN is very suitable in uniquely identifying frames. The periodic allocation rule may define every n'th frame, for example, by defining an integer value n and an offset value 0 ... n−1. Every n'th frame for a first communications device can be defined, for example, by the mathematical modulus operation, as the following notation: offset{0} SFN mod n, where mod stands for the modulus operator. For a second communications device, every n'th frame period with a different offset can be defined, for example, as offset {1} SFN mod n.

For different communications devices, the modulus and offset values may be set differently depending, for example, on their communication needs, their active traffic types, and/or quality requirements. This is discussed in more detail in connection with FIGS. 5a to 5e. The modulus values can be adjusted when the transmission load in the communications system changes. (A skilled person recognizes also the need to adjust the offset values accordingly.) In a heavily loaded cell, the allocation opportunities may appear more rarely and in a lightly loaded cell, the allocation opportunities may appear more frequently; this at least for traffic flows that allow such adjustments. If there is an overload situation, the allocation rules may be adjusted by increasing the values of modulus. As an example, the modulus value n of all allocation rules can be multiplied by two. The result is that the possible amount of allocated transmission resources per time unit for each communications device is reduced to half and the load is thus decreased. Adjusting the modulus values is possible within the delay requirements of the traffic flow, and it is especially suitable for data flows which are not time critical and can wait a longer time in a buffer. It should be noted that adjusting the modulus values is not absolutely required to mitigate an overload situation in the down link direction. If the load is heavy, the communication system would just not allocate the user in all the sets of transmission resources that the user is following according to his allocation rule. If it is desired to translate the scarcer allocation of resources into a power saving for the communications device, the allocation rule may be changed.

Various n values used in a communication system may be, for example, powers of 2 (that is n=1, 2, 4, 8, ... ). But this is by no means the only possible choice for values of n.

If allocation information is transmitted once per superframe, an allocation rule typically defines which frames of a superframe a communications device monitors for allocation information. If a set of transmission resources contains substructures, whose reservations are individually announced, the substructures may be identified, for example, by an identifier of the set of transmission resources and a separator. For example, a substructure of slots in a frame may be identified by a system frame number and a separator. The separator may be an additional subfield or it may be a bit-range extension to the original system frame number. It is thus possible to use embodiments of the present invention, even if the allocation space is more than one frame at a time or shorter than a frame at a time.

For conversational traffic types, transmission resources in uplink and in downlink are typically allocated to a communications device based on the same set of allocation rules, even if the actual allocation may occur independently to the opposite link direction. For example, for data transmission in downlink, transmission resources are allocated in the sets of transmission resources defined by a periodic allocation rule, when there is data to transmit to the communications device. Similarly, in uplink, the communications device may be allocated sets of transmission opportunities defined by the periodic allocation rule. This way the communications device can indicate to the communications system that it has more data to transmit. After receiving the first indication, the communications system may then allocate more precise resources to the communications device in the subsequent sets of transmission resources, thus allowing the communications device to send its data.

FIG. 3a shows, furthermore, uplink frames 301a, 302a, 303a, 304a, 305a and 306a as an example of uplink sets of transmission resources. The uplink frames in FIG. 3a illustrate functionality of frequency division duplex (FDD), where transmission and reception in the uplink and downlink directions occur at different frequencies. The allocation information in the downlink frames 301, 303 and 305 informs the communications device 101 whether transmission resources have been allocated this communications device in the uplink frame 301a, 303a, and 305a. The timing offset between DL and UL frames in FIG. 3a is only exemplary. The UL and DL frames may be aligned or offset, or they may even be of different length and size. An alternative for the Frequency Division Duplex (FDD) arrangement may be a Time Division Duplex (TDD) arrangement, where the downlink and uplink operate on the same carrier frequency.

FIG. 3b shows schematically an example where there is a first allocation rule with a longer period (rule#1 in FIG. 3b) and a second conditional allocation rule with a shorter period (rule#2 in FIG. 3b). The first allocation rule may be called a long-term allocation rule and the second allocation rule may be called a short-term allocation rule. Consider an example, where a communications device 101 is transmitting and receiving voice data. Voice codecs typically output a voice packet periodically, and therefore the communications device wishes to transmit a voice packet periodically. For supporting voice data transmission from a communications device, it is sufficient to define a periodic allocation rule (rule#1). The communications system then allocates transmission resources in all downlink and/or uplink frames as defined by the allocation indication present according to the periodic allocation rule.

For voice frames received from the codec at the other end of the voice connection over a network and transmitted to a communications device, there may be transmission delay jitter caused by the network itself. This is especially true for a packet-switched network, where routing queues and routing algorithms will cause variable packet delays. Consider the example in FIG. 3b, where the long-term rule (rule#1) defines that frame 311 is expected to contain a voice packet for the communications device 101. If a voice packet is not available for transmission to the communications device 101 in frame 311, it is typically not possible to delay the transmission of the voice packet until the next frame 319 defined by the long-term (every-eight-frame) allocation rule. Therefore, if the communications device 101 notices that a frame 311 defined by the long-term allocation rule does not contain transmission resources allocated for this communications device 101, it starts to use the short-term allocation rule (rule#2). The short-term allocation rule may also be a periodic rule. In FIG. 3b, the short-term allocation rule (rule#2) defines that the communications device 101 monitors allocation information of every subsequent frame. The communication device 101 notices that frame 312 does not contain transmission resource allocated for this communications device. Frame 313, on the other hand, has transmission resource allocated for this communications device. After finding transmission resources allocated for itself in a downlink frame defined by the short-term allocation rule (and correctly receiving the information carried by the allocated transmission resources), the communication device 101 returns to using the long-term allocation rule. This way the long-term allocation rule and the short-term allocation rule may alternate in order. As frames 319 and 327 contain transmission resources allocated for the communications device 101, it does not employ the short-term allocation rule after these frames.

It is appreciated that the allocation of uplink and downlink frames for voice data (or other data flow with expected transmission time interval) need resources based on a long-term allocation rule. For an associated data flow, a conditional short-term allocation rule is typically needed in addition to the long-term allocation rule. It is also possible to specify an independent long-term allocation rule and an independent short-term allocation rule for a communications device 101. Associated data flow here means that the forward-flow is tightly coupled to the reverse-flow, or vice versa. An example of this is TCP acknowledgements, which always follow a delivery of a segment to the other link direction. Other examples are interactive or transaction traffic-flows, where a given initiation-action determines the response-action to the other link direction. Thus, traffic characteristics and transmission needs of forward and reverse links are coupled.

As a second example of usage of a conditional short-term allocation rule, consider retransmission of data when the reception of the data fails for some reason. If the communications system does not receive data from the communications device 101 or an acknowledgment of receipt is lost or when the communications device 101 sends a negative acknowledgement of receipt the communications system typically retransmits information in accordance with a short-term transmission rule until a positive acknowledgment is received from the communications device 101. The communications device 101 may be triggered to use this short-term rule for allocation information monitoring in response to an unsuccessfully received piece of information, and the communications system allocates resources for the retransmission based on the short-term allocation rule. Similarly, if the communications device 101 does not receive a positive acknowledgement in response to data transmitted to the communications system, this may be indicated to the communication system, and the communications system may start to allocate transmission resource for uplink retransmissions based on a short-term allocation rule. The communications device 101 monitors allocation information in accordance with the short-term allocation rule and retransmits information when having noticed transmission resources allocated for itself in the uplink direction.

FIG. 3c refers to a third example, where two periodic allocation rules are used in combination. Here the first periodic allocation rule is used to allow the communications device 101 to check allocation information only quite seldom (for example, in frames 330, 360, 390). If the communications system has data to transmit to the communications device 101, the communications system may indicate this by announcing start of transmission in one of the sets of transmission resources defined by the first periodic allocation rule. In FIG. 3c, the start of transmission is announced in frame 360. This announcement may be in the allocation table or in the payload carried by that frame. Thereafter the communications device 101 switches to apply a short-term rule for monitoring allocation information. In the example in FIG. 3c, the short-term rule defines that the communications device 101 monitors allocation of each subsequent frame 361, 362, . . . , 371. In frame 371, the allocation information no more indicates allocated transmission resources for the communications device 101, and thus the communications device knows that it should again switch to apply the long-term allocation rule for monitoring. The next frame, whose allocation information the communications device 101 monitors, is frame 390 in accordance with the long-term allocation rule.

For a communications device to be able to transmit information in the uplink, the communications system may allocate transmission resources based on a long-term rule. Once having transmission resource allocated in the uplink, the communications device may indicate to the communications system that it has data to transmit. This indication may be, for example, transmission of a piece of data waiting transmission using the resources allocated based on the long-term rule. Alternatively, the communications device may indicate the amount of data (together with the actual delivery of the first part of data) it has available for transmission. Thereafter the communications device may start to monitor allocation information in accordance with a short-term rule and to transmit information when it notices that there are transmission resources allocated for it in the uplink direction. Once there is no more data to transmit in the communications device (or the communications device has transmitted as much data as it desires to transmit currently), the communications device may simply stop use of transmission resource allocated to it or the communications device may indicate it has no more data. In response to noticing unused allocated resources, the communications system may start allocating transmission resources in the uplink based on the long-term rule and the communications device may start monitoring allocation information in accordance with the long-term rule. Devices transmitting non-delay-sensitive data every now and then could use this kind of transmission scheme.

A further example of an allocation rule is a rule that refers to a sequence of sets of transmission resources starting from a given future set. This sequence of sets starting from a given future set of transmission resources may be called a continuum. The future set of transmission resources, where the next continuum begins, may be identified, for example, by a sequence number of the set or by a time instant at which the future set of transmission resources is transmitted/received. The communications device starts to monitor allocation information at the given future set and continues this monitoring (possibly in accordance with a short-term rule) until told otherwise. The communication device is told to stop using the short-term allocation rule by giving, for example, in a payload of one of the sets of transmission resources of the current continuum a pointer to a next future set of transmission resources of the next continuum. The set of transmission resources containing the pointer to the next continuum is typically defined to be the last set of transmission resources in the current continuum.

The short-term allocation rule which the communications device uses for monitoring allocation information starting from the given set of transmission resources may be implicitly known, or a short-term allocation rule for a next continuum may be explicitly specified together with the pointer to the next continuum.

It is possible that—in addition to the payload containing the pointer to the next continuum—there are no other transmission resources allocated for the communications device in the present continuum. As an alternative to the allocated payload, the pointer to the next continuum may be in a piece of allocation information.

It is possible that there is defined a set of allocation rules for each connection. Here a set of allocation rules refers to one allocation rule or to a combination of allocation rules. As an example of a combination of allocation rules, consider the above discussed combination of two periodic allocation rules with different periods) for each connection. In this case, the communications device 101 should contain functionality to monitor allocation information as defined jointly by the flow-specific or connection-specific (typically uniquely defined by the Internet Protocol address and the port number) allocation rules. Alternatively, it is possible to define a set of allocation rules for a communications device. This communications-device-specific set of allocation rules should meet transmission requirements of all flows (connections) of a communications device. The communications system may contain functionality for determining device-specific allocation rules based on requirements of the connections. The communications system may contain functionality for determining device-specific allocation rules based on the capability of the communications device. Examples of how the communications system and the communications devices can keep information about allocation rules are discussed in some detail below in connection with a second embodiment of the invention.

It is appreciated that a communication device needs time to process allocation information and, if uplink transmission resources have been allocated to the communications device, to process data and send data in the uplink direction using the allocated uplink transmission resources. A piece of allocation information transmitted in the downlink direction and indicating allocation of uplink transmission resources should thus refer to uplink transmission resources occurring after a long enough time interval. Communications devices may have different capabilities to process received information and to transmit information. It is thus possible that a first communications device can transmit data in the uplink direction sooner than a second communications device in response to noticing allocation of uplink resources. It is possible that for the first communications device, a piece of allocation information indicates uplink transmission resources in the next set of uplink transmission resources. For the second communications device, the same piece of allocation information may refer to uplink transmission resources in a set of uplink transmission resources occurring at a later time instance. In other words, a piece of allocation information may refer to a plurality of sets of uplink transmission resources.

Figure 10A:
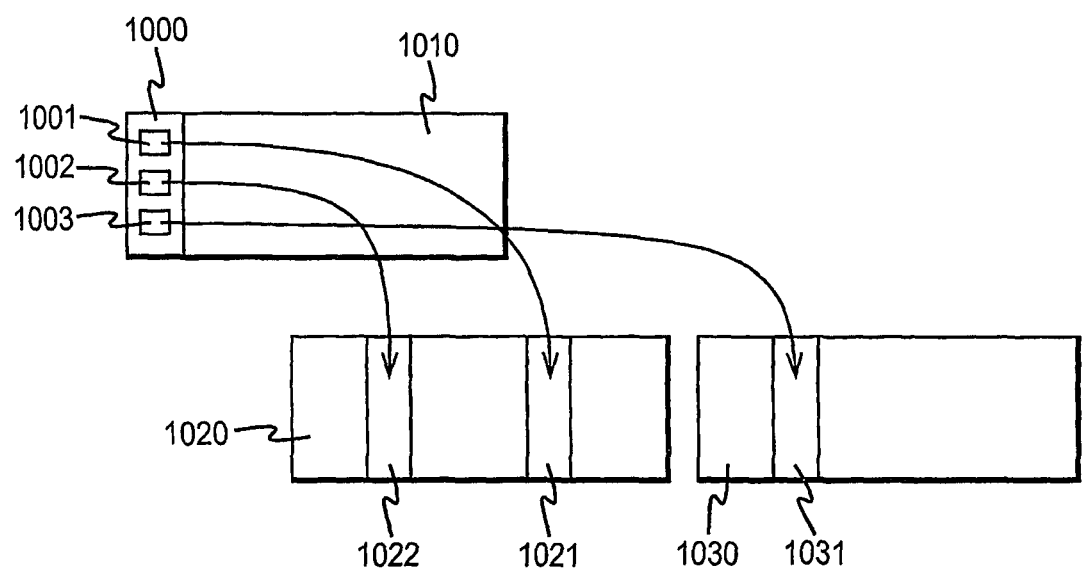
FIG. 10a shows schematically an example relating to a piece of allocation information associated with more than one set of uplink transmission resources.

FIG. 10a shows an example relating to a piece of allocation information referring to more than one set of uplink transmission resources. In FIG. 10a, a piece of allocation information 1000 is transmitted together with a set of downlink transmission resources 1010 by way of an example. The piece of allocation information 1000 is monitored by at least communications devices UE1, UE2 and UE3. As an example, UE1 and UE2 have similar processing capabilities and UE3 has less processing capacity. The piece of allocation information 1000 indicates allocation of uplink transmission resources to at least three communications devices UE1, UE2, UE3. A first allocation indication 1001 indicates allocation of uplink transmission resources 1021 to UE1 in the next set 1020 of uplink transmission resources. A second allocation indication 1002 indicates allocation of uplink transmission resources 1022 to UE2 in the same set 1020 of uplink transmission resources. A third allocation indication 1003 indicates allocation of uplink transmission resources 1031 to UE3 in a later set 1030 of uplink transmission resources. The communications device UE3 may thus process the allocation information 1000 and prepare itself to transmission accordingly for a longer time period than UE1 and UE2.

Alternatively, a piece of allocation information may refer to a single set of uplink transmission resources. If the communications devices have different processing capabilities, the single set of uplink transmission resources should occur after a sufficiently long time interval. In other words, in FIG. 10a the allocation indications 1001, 1002 and 1003 could all refer to transmission resources in the set of uplink transmission resources 1030.

Regarding downlink allocations, a piece of allocation information typically refers to a single set of downlink transmission resources. Downlink allocation information may be sent in connection with the relevant set of downlink transmission resources. This set of transmission resources may start from the same frame SFN, where the Downlink allocation information is given or after a processing time e.g. SFN+1. A communications device may thus simply continue receiving the downlink signal and process the received signal properly only if the downlink allocation information indicates transmission resources allocated to this communications device. Referring to FIG. 10a, the piece of allocation information 1000 typically contains also information about allocation of the transmission resources in the set 1010. Alternatively, downlink allocation information may be sent, for example, with an earlier set of downlink transmission resources. This would be a special embodiment of the pointer mechanism, where a pointer, given earlier with a set of downlink transmission resources, is pointing to this future set of transmission resources.

The allocation information typically need not specify to which set of uplink transmission resources the allocation information refers. Typically the respective communications device and the communications system know this beforehand. The communications devices may be, for example, grouped into classes which specify the processing capabilities of the communications devices in this respect. The communications system needs to take the different capabilities of the communications device into account when allocating uplink resources and when constructing allocation information to be transmitted.

FIG. 10b shows a second example, where a piece of allocation information may refer to more than one set of uplink transmission resources. The communications devices UE1-UE3 have similar capabilities, and the communications device UE4 has a lower capability. Therefore allocation table entries referring to UE1-UE3 indicate allocation of uplink resources in an uplink frame i+1, whereas allocation table entries referring to UE4 indicate allocation of uplink resources in an uplink frame i+2. This is indicated with dashed lines in FIG. 10b. FIG. 10b is discussed in more detail below in connection with the second embodiment of the invention.

It is appreciated that acknowledgement information for uplink transmissions may be transmitted to a communications device in accordance with the allocation rules associated with the uplink transmissions. In other words, a communications device monitoring allocation information of uplink transmission resources monitors simultaneously uplink acknowledgement information.

FIG. 11 shows an example of transmitting uplink acknowledgement information in accordance with an allocation rule associated with the uplink transmissions. FIG. 11 shows, as an example, sets of downlink transmission resources 1101-1109 and corresponding sets of uplink transmission resources 1101a-1109a. Allocation information for the sets of uplink transmission resources 1101a-1109a is transmitted, by way of an example, in connection with corresponding sets of downlink transmission resources 1101-1109. In the example shown in FIG. 11, a communications device monitors the allocation information of every fourth set of uplink transmission resources, namely allocation information transmitted together with the sets 1101, 1105 and 1109 of the downlink transmission resources. The allocation information in connection with the set 1101 of downlink transmission resources indicates that transmission resources have been allocated in the set 1101a for this communications device (indication 1121). The communications device transmits uplink information using the allocated transmission resources in the set 1110a. The communications system acknowledges (positively or negatively) the uplink transmission by transmitting uplink acknowledgement information 1135 in connection with the set 1105 of downlink transmission resources. In other words, the uplink acknowledgement information is transmitted in accordance with the allocation rule defining which allocation information the communications device monitors. As discussed above, the communications device may ignore the allocation information and consequently also the acknowledgement information transmitted in connection with sets 1102, 1103 and 1104 (if there are no other allocation rules associated with the communications device defining that the communications device should monitor also these sets 1102, 1103 and 1104).

It is appreciated that in the example shown in FIG. 11 the communications system may be ready to transmit the uplink acknowledgement information already earlier than in connection with the set 1105. The communications device, however, may transmit further uplink information at earliest using the set 1105a. Sending uplink acknowledgment in accordance with the allocation rule thus does not cause extra delays to the uplink transmissions.

Typically an uplink acknowledgment 1135 is sent together with an indication 1125 of allocated uplink transmission resources. If there are no uplink resources allocated to the communications device in the set 1105a, the communications device may delay sending of the uplink acknowledgement information so that the uplink acknowledgement information is sent together with allocation information indicating allocation of uplink resources to this communications device. It is, however, possible that uplink acknowledgments are sent with the earliest piece of allocation information in accordance with the allocation rule (that is, with set 1105 in FIG. 11) even when there are no uplink transmission resources allocated for the communications device in the relevant set (that is, in set 1105a) of uplink transmission resources. This is true, for example, when the communications device has requested no more uplink resources and the uplink acknowledgement is positive. An example is shown in FIG. 11, where a positive acknowledgement 1139 is sent in connection with the set 1109 of downlink transmission resources.

Figure 12B:
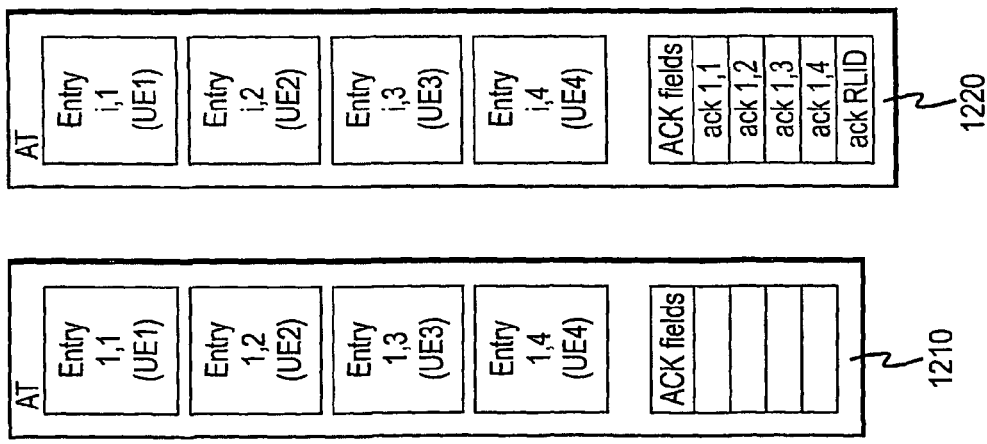
FIG. 12b shows schematically a further example of allocation tables containing uplink acknowledgements relating to FIG. 10b.
Figure 12A:
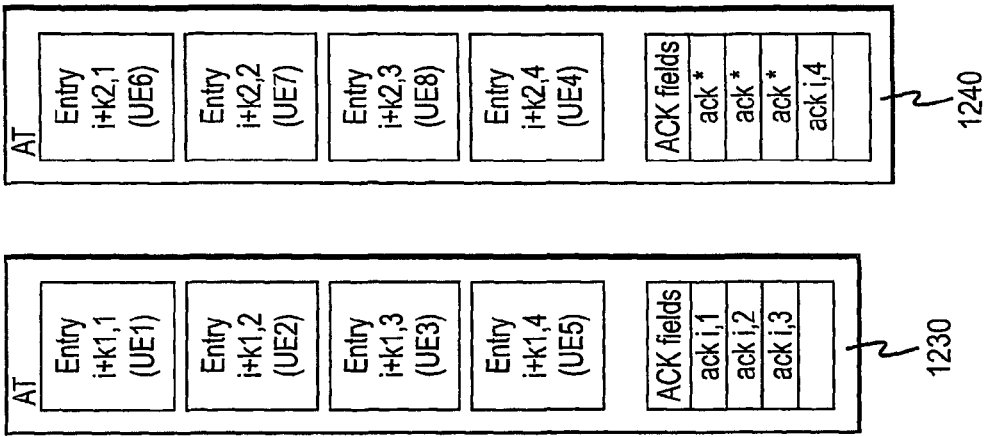
FIG. 12a shows schematically examples of allocation tables, which contains also uplink acknowledgements.

As a plurality of communications devices typically monitors the allocation and acknowledgement information transmitted by the communications system, an uplink acknowledgement needs to be associated with a specific communications device. One alternative is that the order of acknowledgments is in accordance with the order of allocation indications sent together with the acknowledgement. As the allocation indications are associated with communications device identifiers, for example, with radio link identifiers, the uplink acknowledgements are thus also associated with communications device identifiers. A further alternative is to explicitly transmit communications device identifiers with the uplink acknowledgments. This alternative is needed when uplink acknowledgements are sent for communications device for which indication of allocated uplink transmission resources is not sent at the same time. FIGS. 12a and 12b discuss further details of sending uplink acknowledgements in connection with uplink allocation information.

Transmitting uplink acknowledgements in accordance with an allocation rule provides the advantage that the communications device can follow the discontinuous transmission/reception defined by the allocation rule. Furthermore, transmitting uplink acknowledgements separately from, for example, downlink user data, provides the advantage that the uplink acknowledgements can be protected against transmission errors using a strong channel coding. Typically uplink acknowledgement information and uplink allocation information is sent together in accordance with the allocation rule associated with the uplink transmission. By transmitting the uplink acknowledgments in an order in accordance with the order of uplink allocation indications it is possible to save in the transmission overhead. This is because the identifiers associated with the communications devices need to be sent only once for each set of uplink transmission resources.

In the following, a second embodiment of the invention is discussed. In this second embodiment, a set of transmission resources is a radio frame and an allocation table in the beginning of a downlink radio frame is a specific example of allocation information. Other examples of allocation table placement in a frame are center of the frame, a special placement in the frame as close to the pilot symbols or training sequences. The allocation table may refer to transmission resources in the same downlink frame that it is placed in, and/or to any following frame. Similarly, the allocation table may refer to transmission resources in any upcoming uplink frame. Furthermore, identifiers of communications devices in the allocation table are radio link identifiers (RL ID) or group allocation identifiers. It is evident that any features discussed in connection with the second embodiment, which are not applicable only to radio frames, to an allocation table in the beginning of a downlink radio frame or to radio link identifiers, are applicable also on a more general level. Furthermore, in connection with the second embodiment, a communications device is called a terminal and a transceiver network element is called a base station.

An idea in the second embodiment is to form parametrisable AllocationTables, which are separate from each other. Radio Link Identifier (RL ID) identifies the allocation for each terminal, as RL ID is unique for any terminal in any cell. It is also assumed that the allocation identification cannot be apriori ordered, because the traffic requirements (buffer status and delay) will change from one AllocationTable to another. For each instant of the AllocationTable, it is necessary to include RL IDs of all those terminals, which will get allocation, and it is necessary to signal their order of allocation, if not otherwise obvious. The order in which RL IDs are listed in the AllocationTable entry is one way to announce the order of allocation. If the order and size of allocation are not coupled, additional bit fields are needed to announce the order and size of allocation in resource units.

In this second embodiment, the AllocationTable may be assigned an identifier so that the terminals know which AllocationTables to monitor. A reasonable separator for AllocationTables is System Frame Number (SFN), which is a long unique sequence, which identifies frames uniquely and is commonly available for the communications system and for all communications devices operating therein. AllocationTable identifiers may be implicitly calculated and they need not be signaled frequently. Some initial signalling may be necessary to negotiate between the base station and the terminal, which AllocationTables this terminal follows, that forms the allocation rule. This depends, for example, on the active traffic flow types of the terminal and load situation of the network. As discussed above, uplink and downlink AllocationTables may be separate and they may follow a separate allocation rule. However, these tables may be joined, and just the link direction need to be indicated for every allocation. If the rule for AllocationTable for a given terminal changes, that has to be signaled to the terminal. This may happen, for example, when a traffic flow is activated, modified or terminated.

Figure 4A:
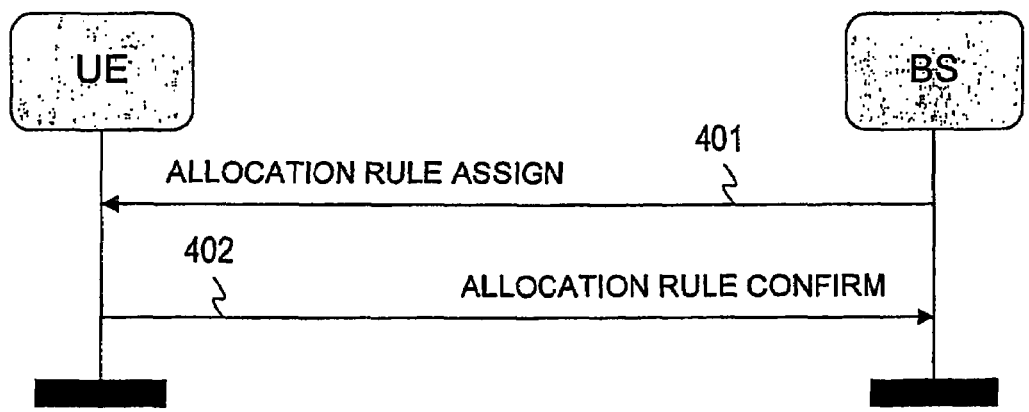
FIG. 4a shows schematically, as an example, a procedure for assigning allocation rules for the downlink direction.
Figure 4B:
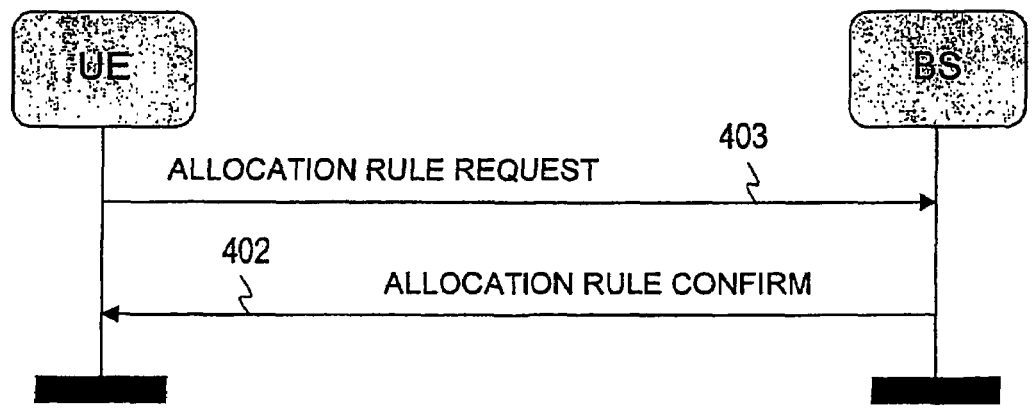
FIG. 4b shows schematically, as an example, a procedure for negotiating allocation rules for the uplink direction.

FIGS. 4a and 4b show schematically procedures for negotiating and assigning allocation rules for the downlink and uplink directions, respectively. In downlink, the base station may assign an allocation rule for a terminal based on its knowledge about, for example, the following:
  terminal capability
    Full-Duplex/Half-Duplex
  traffic flows active in downlink and uplink
    downlink criteria separately from uplink criteria
    downlink criteria to satisfy uplink traffic criteria
  traffic flow characteristics
    traffic flow delay or bit rate requirements
  traffic buffer status The base station informs the terminal about the allocation rule by sending an allocation rule assign message 401. The terminal will verify the allocation rule and check, if it can meet these requirements in terms of capability and whether this allocation rule would satisfy its expectations for the downlink traffic. If the terminal accepts and is able to satisfy the rules, it will send a confirmation message 402 to the base station. Otherwise, the terminal will not confirm the rules but will propose modifications to the rules instead. If the terminal needs more tight allocation rules, it may propose them to the base station separately. On the other hand, if terminal wants to have more loose allocation rules, for example, to have longer DTX or DRX periods, it may propose this as well to the base station. Alternatively, it is possible that the base station will assign a set of possible allocation rules in the allocation rule assign message, from which the terminal has to select one and response this choice in the allocation rule confirm message.

In uplink, the terminal will make a request for getting uplink allocation by sending an allocation rule request message 403. This request may already include a proposal for the allocation rule. The base station will verify and check, if it can meet the requirements (for example, in terms of channels available and load) this proposal sets and whether this rule would satisfy its expectations for the uplink traffic. If base station is able to satisfy the rules, it will send a confirmation message 402 to the terminal. If the base station wants or needs to modify these rules, it will respond to the terminal with an allocation rule assign message 401 in addition to the negative confirmation message 402. Uplink allocation rule may be based on the knowledge about, for example, the following:
  terminal capability
    Full-Duplex/Half-Duplex
  traffic flows active in downlink and uplink
    uplink criteria separately from downlink criteria
    uplink criteria to satisfy downlink traffic criteria
  traffic flow characteristics
    traffic flow delay or bit rate requirements
  traffic buffer status
  measured pilot signal strength The messages necessary for negotiating the allocation rules may belong either to a stand-alone procedure or the information contents of these messages may be embedded as Information Elements to some other suitable procedure or to the messages of this other procedure. These messages may be placed in the access channels, for example, random access, direct access or forward access channels or as well to dedicated or shared channels.

Figure 4C:
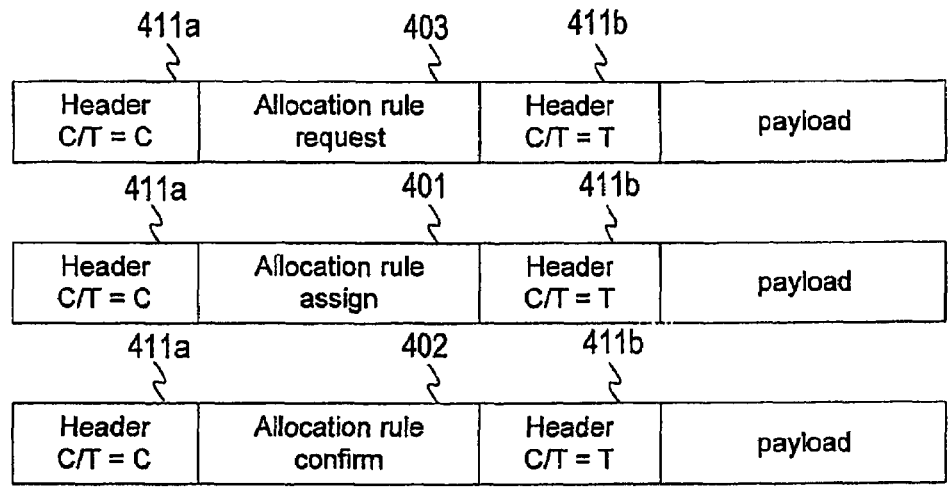
FIG. 4c shows schematically, as examples, protocol messages for carrying allocation rule assignment and negotiation information.

FIG. 4c shows, as examples, protocol messages for carrying allocation rule negotiation and assignment. FIG. 4c shows a possible protocol message structure for carrying the allocation rule request message 403, the allocation rule assign message 401, and the allocation rule confirm message 402. The protocol header includes, among other definitions, a Control/Traffic (C/T) flag 411, which describes, whether the payload includes a signalling message (C/T=C) or user plane traffic (C/T=T). For control message and for user plane traffic payload, the segmentation sizes may be different. When ever control protocol data units (Pdus) are set into a given resource unit, it is optional whether there can follow user traffic payload Pdus in the same resource unit during the same Transmission Time Interval (TTI) or if they have to be multiplexed into a separate TTI.

FIGS. 5a to 5e illustrate different possible ways for using allocation rules. The System Frame Number SFN is available in this second embodiment, and it can serve as the time descriptor of the AllocationTable. SFN allows a different AllocationTable appear for each frame, and it allows this in a unique way over a very long period of time. Say, if the optimum maximum number of active users identified in AllocationTable is 8 and there are up to 8 active users any allocation of these 8 users may appear at any time, see FIG. 5a. If there are between 8 and 16 active users, their allocations could be conveniently split to two AllocationTables, see FIG. 5b. Respectively for 32 users, the allocation may be split to four tables, see FIG. 5c. If all 16 users in FIG. 5d have frequent data, then a given set of 8 users could be present in every second frame, offset{0} SFN %2 (modulo) and the other set of 8 users in every second frame as offset{1} SFN %2. This allows that each terminal would know, in which AllocationTable its allocation may be announced and thus it would only need to follow every second AllocationTable. Further on, the terminal knows its RL ID in that AllocationTable. There is not much penalty of dividing terminals between several AllocationTables. On the other hand it adds a small delay, but it saves in signalling and allows Discontinuous Reception (DRX) and/or Discontinuous Transmission (DTX). In many typical situations, the allocations need not be that frequent.

Figure 5A:
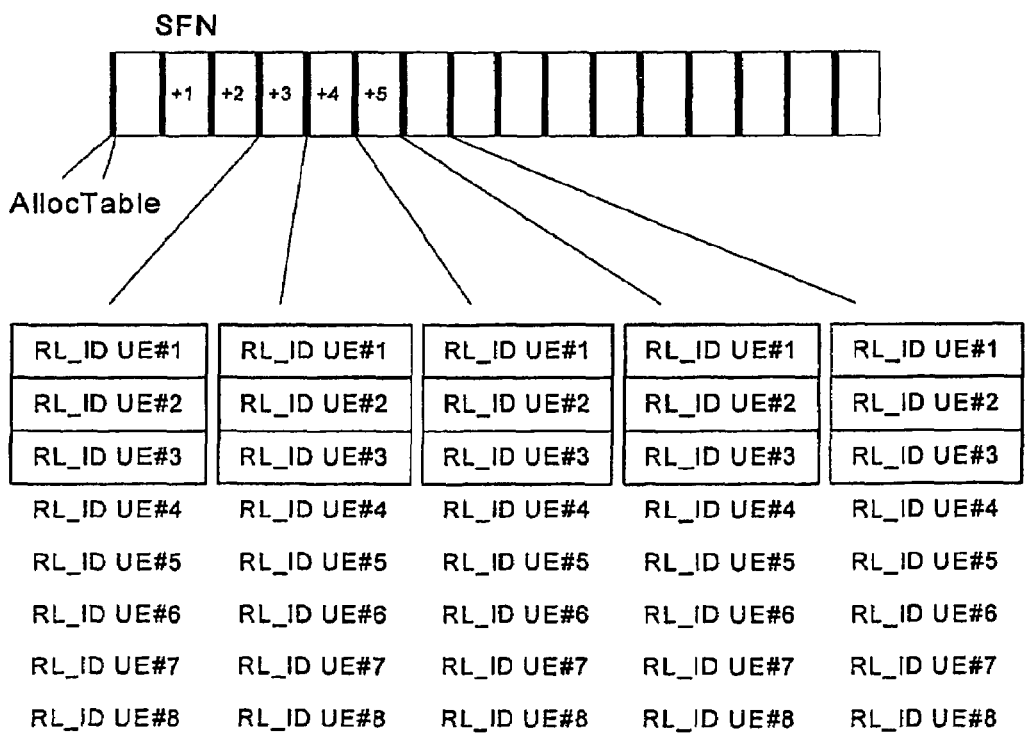
FIG. 5a shows, as an example, allocation of frames for up to eight active users.
Figure 5B:
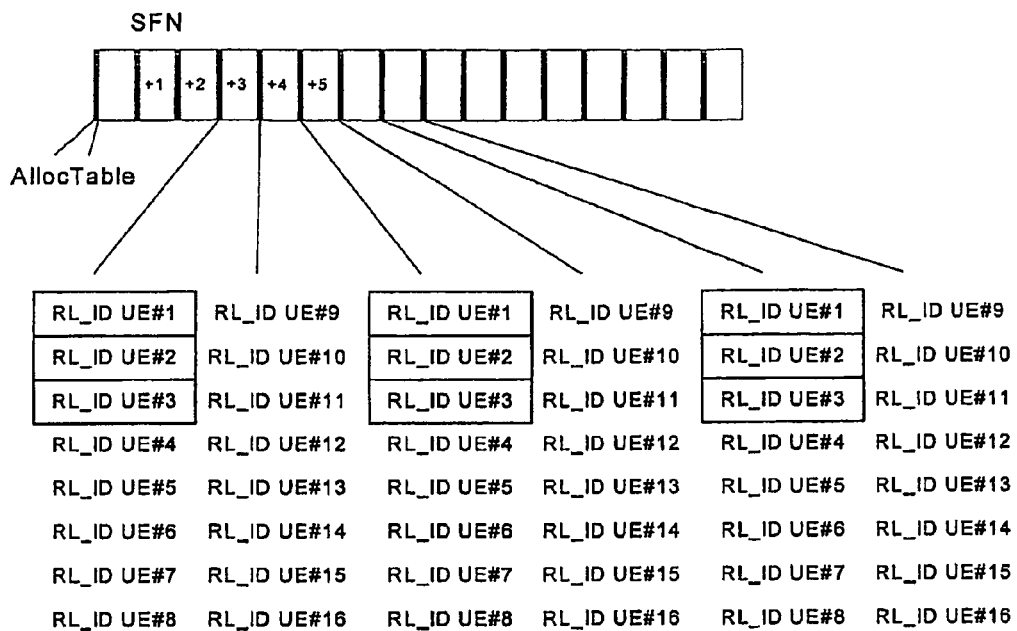
FIG. 5b shows, as an example, allocation of frames for up to sixteen active users, the users being split to two sets for efficient monitoring of their allocation information.
Figure 5C:
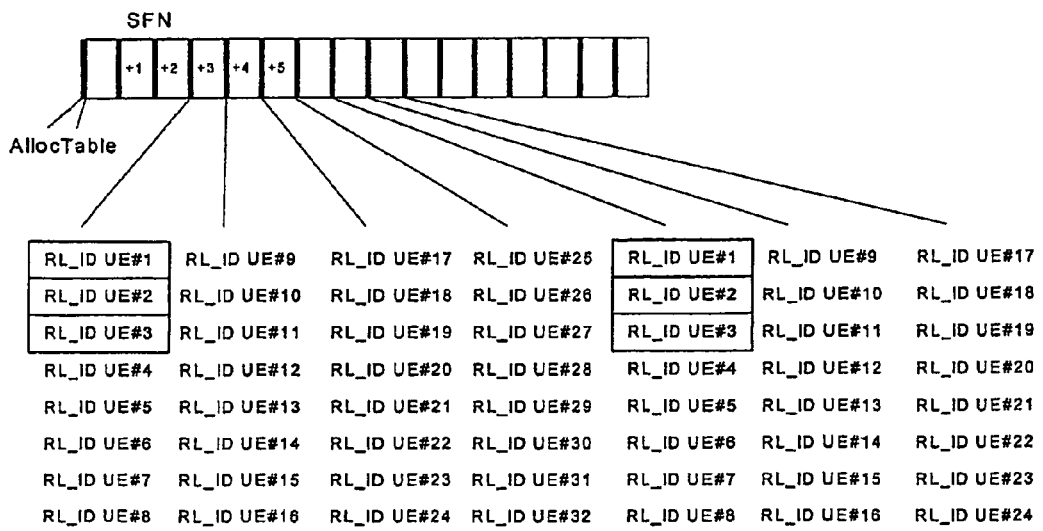
FIG. 5c shows, as an example, allocation of frames for up to 32 active users, the users being split to four sets for efficient monitoring of their allocation information.
Figures 5D, 7A:
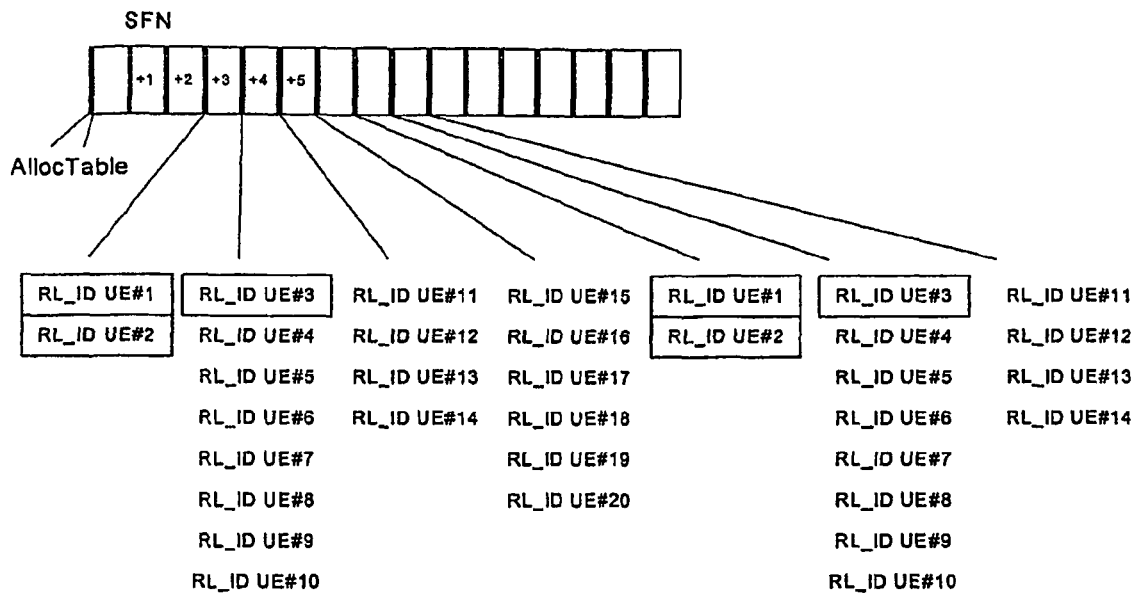
FIG. 5d shows, as an example, allocation of frames for 20 active users, the users being split unequally up to four sets for efficient monitoring of their allocation information.
FIG. 7a shows, as an example, structure of a protocol message announcing start of a next continuum and optionally an allocation rule in the continuum.

As a function of number of active terminals in the sector, the terminals may be split to any chosen number of AllocationTables, which are announced as SFN %n AllocationTable. Each set of 2, 4 or 8 terminals follow a separate AllocationTable, first set with offset{0}, second set with offset{1}, third set with offset{2} and so forth to the offset{(n−1)}. This is illustrated in FIG. 5d, which shows allocation for 20 active users. Each user follows AllocationTables by SFN %4 rules; terminal #1-#2 follow offset{0}, terminals #3-#10 follow offset{1}, terminal #11-#14 follow offset{2} and terminals #15-#20 follow offset{3}.

Figure 5E:
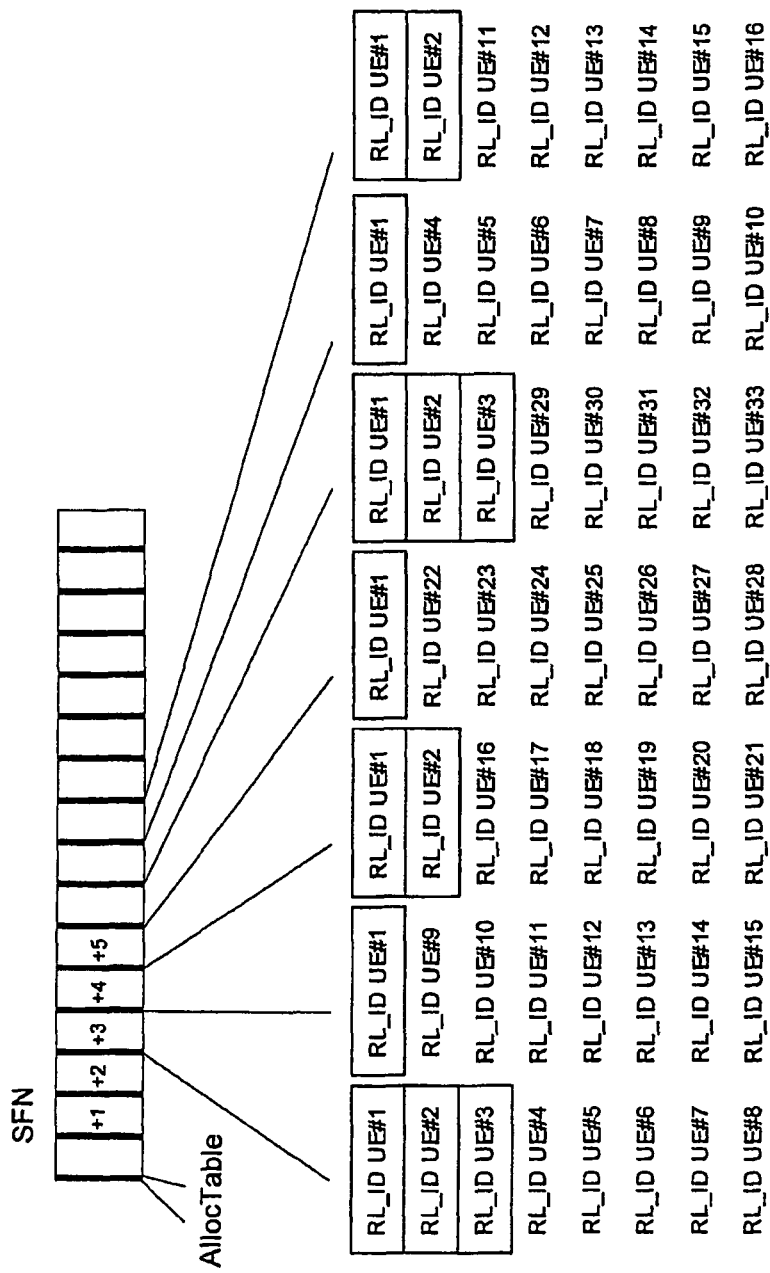
FIG. 5e shows a further example of allocation of frames, where the allocation decoding periods are different for different users.

If the traffic volumes are not equal, the resource allocations need not be equal for different terminals, further the AllocationTable rule need not be equal for different terminals. A terminal with high traffic volume may be assigned SFN %1 AllocationTable, or SFN %2 AllocationTable rule. This means that the terminal may receive data in every frame or every second frame respectively. The other terminals may still follow any other SFN %n allocation rule. The only requirement is that both the base station and the terminal know, which allocation rule the AllocationTable may follow. This is illustrated in FIG. 5e, where terminal #1 follows SFN %1 AllocationTables, terminal #2 follows SFN %2 AllocationTables, terminal #3 follows SFN %4 AllocationTables and all others follow some other AllocationTable rules. It is possible that some terminals do not have allocation rules, but they follow all allocation tables. This, however, consumes terminal power.

It is appreciated that another differentiator for AllocationTable rule of different terminals is the delay characteristic of their active traffic flows. A terminal with delay sensitive traffic may be assigned SFN %1 AllocationTable or SFN %2 AllocationTable rule. The other terminals with less delay sensitive traffic flows may then follow a less frequent SFN %n AllocationTable rule.

Figure 5F:
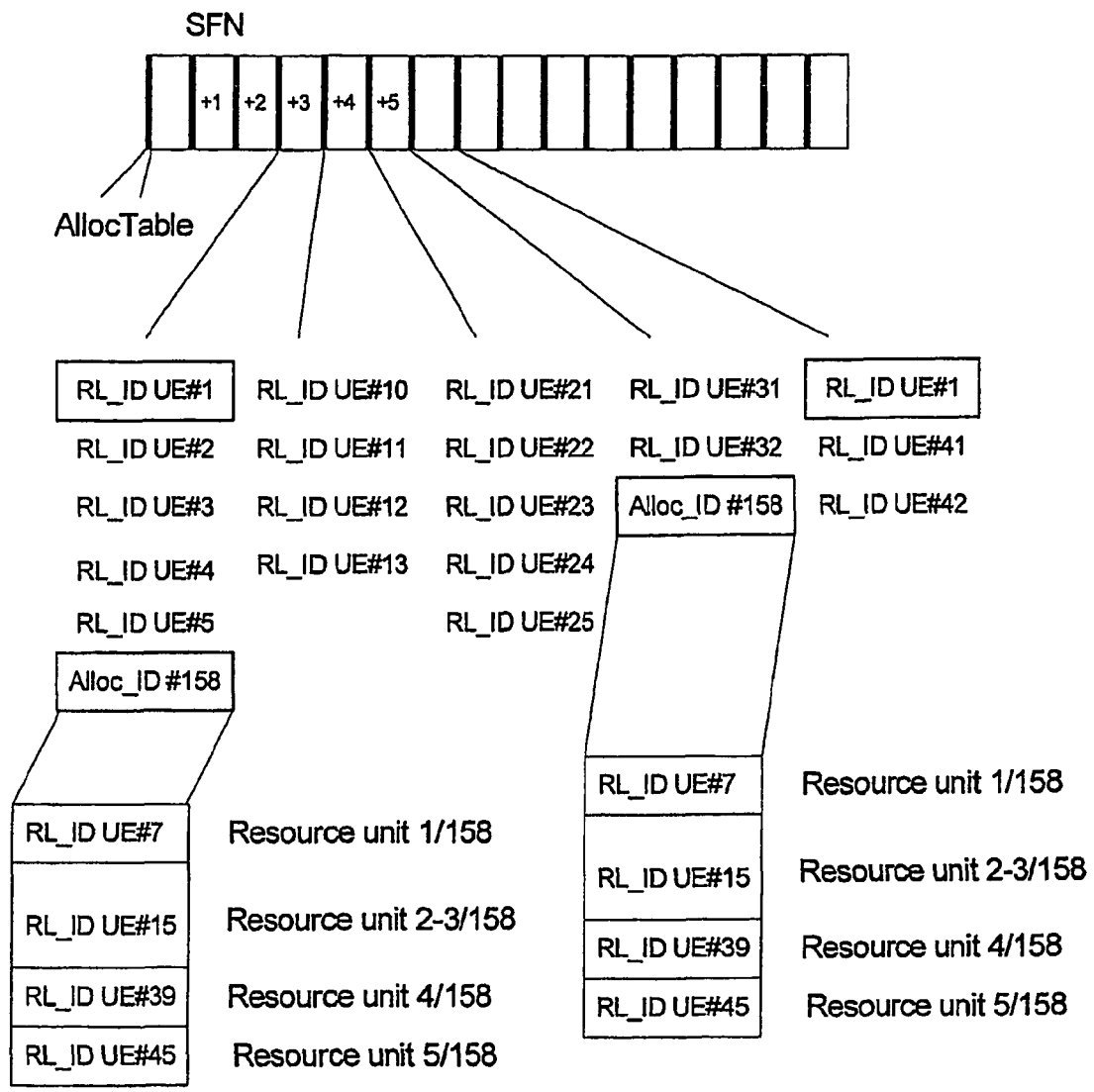
FIG. 5f shows schematically an example of the use of a group identifier.

FIG. 5f shows schematically an example relating to the use of a group allocation identifier. Several terminals may be allocated a single common group allocation identifier (Alloc_ID), which can be used for their joint allocation reference. Use of Alloc_ID saves signalling space in the AllocationTable, as for joint allocation, signalling of a single Alloc_ID is sufficient instead of several RL_IDs. The group allocation identifier sets the requirement that allocations and DTX/DRX patterns of the connections under the Alloc_ID follow exactly the same pace, pattern and resource sharing. Of course, any of the connections may still have their independent allocations and DTX/DRX rules signaled by their individual RL_ID. As discussed above, there may be defined separate information specifying the allocation of resources associated with the group allocation identifier. These group rules are valid for those allocation periods, whenever the allocations are announced by that Alloc_ID. In a group allocation, the allocation contents may still be unique for each user, but in this case there has to be a-priori arrangement (in other words, the group rules) of those allocations inside the common resource unit pointed by the Alloc_ID. For example, four users may receive pieces of personalized data. In this case their allocation is common, but the resource is shared among those four users for every event of allocation, as shown in FIG. 5f.

FIG. 5f relates to a situation where terminals UE#7, UE#15, UE#39 and UE#45 are determined to follow a common allocation rule. Therefore, each of these terminals, is signaled that in addition to their RL_ID indication for individual allocations, they have to follow a group allocation announced by Alloc_ID, given here as #158. When the allocation is announced by the Alloc_ID #158, the terminals will always get a common allocation with a common DRX cycle. In this allocation, the terminal UE#7 will get the first share of size ⅕ of the allocated resource unit, terminal UE#15 will get the second share of size ⅖ of the allocated resource unit, terminal UE#39 will get the third share of size ⅕ of the allocated resource unit and terminal UE#45 will get the fourth share of size ⅕ of the allocated resource unit respectively.

Use of allocation rules for defining which allocation tables a terminal monitors provides a benefit both for the base station and the terminals as the signalling overhead in AllocationTable will reduce. It is obvious that the more allocations are signaled in a single table the more bits this signalling consumes. If every allocation table includes less allocations to signal, less signalling bits are needed. This does not impact the actual amount of resources each connection may get over time. It will also provide significant benefit for the terminal, as it may apply discontinuous transmission and/or reception mode (DTX/DRX) as it knows the rule, how frequently and at which frame it has to decode the AllocationTable. As discussed earlier, the actual allocation identified by that specific AllocationTable may still become largely different. For each AllocationTable, it is possible that the terminal did not get any allocation at all. If it got an allocation, its allocation order in the frame may be variable, the number of allocated resource units may be variable and the Transport Format (Link Adaptation) may be variable defined by an allowed Transport Format set. The Transport Format includes, for example, modulation, channel coding, spreading, multiantenna diversity or MIMO transmission type. The Transport Format may be indicated in the Allocation Table. For a group allocation, the transmission format of all users in a group may be the same, or they may be separately indicated. The benefit of the AllocationTable rule is obvious as it at least reveals, when the terminal need not receive any AllocationTable and when the terminal at least does not have any allocation. This enables DTX/DRX, which allows significant power savings at the terminal, as some power-hungry circuitry may be switched off during DTX/DRX.

A note about the radio channel conditions. The next DTX/DRX activity may happen much further in the future than the channel coherence time. This does not dictate, how long the allocation after the DTX/DRX silence will last, nor it dictates the link adaptation format during the next activity. During the next activity, after the DTX/DRX period silence, any link adaptation, MIMO and such scheme is available even if the radio channel changed from the previous period, if channel feedback knowledge is available. Also scheduling, packet scheduling or such, allows to place the payload to constructive channel conditions during activity, if channel feedback knowledge is available.

The allocation rules may depend, for example, on the following: number of active traffic flows, type of active traffic flows, delay requirements of active traffic flows, bit rate requirements of active traffic flows, terminal capability as Full-Duplex or Half-Duplex, data volumes in the buffers and load of the network.

As also discussed above, the allocation may be independent for uplink and downlink; may be coordinated for uplink and downlink or may be tightly coupled, say uplink reverse flow is determined by the respective forward downlink traffic flow or downlink reverse flow is determined by the respective forward uplink traffic flow. The AllocationTable may contain separate AllocationTable instances for uplink and downlink or they may be announced in a single AllocationTable with the link direction indicator.

In this specific second embodiment, the AllocationTable thus include:
  RL_ID
  Allocation order (optional)
  number of allocated resource units (or other kind of allocation indicator)
  link direction
  Transport Format
    Channel coding Modulation
Retransmission format (IR, HARQ)
SISO/Diversity/MIMO transmission
An entry of the AllocationTable may be given as ---
AllocationTable_SFN.RL_ID.allocation_order.#Resource_units.-
link_direction.Transport_Format
---

As an example of the group allocation, an entry of the AllocationTable may be given as ---
AllocationTable_SFN.Alloc_ID.order in Alloc_ID list.share of the
common ResourceUnit.link_direction.Transport_Format
---

For processing allocation information in an AllocationTable, the terminal typically performs time and frequency synchronization, filtering, frame structure capturing, channel estimation, demodulation, channel decoding, error detection for the AllocationTable, and reading and interpreting the bit-fields in the AllocationTable. Thereafter the terminal can decide whether its RL ID or/and Alloc ID was present in the AllocationTable. In case either one identifier or both identifiers were present, the terminal acts accordingly to transmit and/or receive the actual payload in the set of transmission resources.

In the following, the long-term allocations for traffic types with known expected transmission time intervals (TTI) are discussed. Above reference was made to long-term allocation rules, and the expected TTIs can be used for determining the monitoring period for these long-term allocation rules. As examples, voice, audio and video are discussed below in detail. It is possible to determine the expected TTI, for example, by finding out which type of data is transmitted and/or which codec is used for coding the data. It is appreciated that the details of how the expected TTI is determined is outside the scope of this present invention. The present invention concentrates on using a known TTI for determining allocation rules. Any TTI value may be allowed, for example well-known values of 1 ms, 2 ms, 10 ms, 20 ms, 40 ms, 80 ms up to 100 or 200 ms are typical.

Among the terminals, there may be traffic source activations, which are known to follow certain natural inter-arrival process. An example is voice service, where the voice codec, if AMR (Adaptive multi-rate) or AMR-WB (Adaptive multi-rate Wideband), is known to provide a voice frame every 20 ms, which is the duration of a phoneme. Quantisation and coding of voice is thus processed in 20 ms periods, which forms a voice frame with scaling factors and subband samples inside the frame. Once a voice frame is created, it will be embedded into a Real-Time Transmission Protocol (RTP) packet. The next voice frame and next RTP packet will appear after 20 ms. Similar natural inter-arrival process exists for audio signal. Natural inter-arrival process exist as well for video, where quite typically some 25 picture frames are created per second and a picture update packages appear at 40 ms intervals.

Depending on the settings, the voice codes will provide one packet, whose length is variable depending on the amount of information that the codec generated. Typically the voice frame size is constant for a given audio quality setting, in other words, for a given audio quality setting there is provided a constant bit rate. For adaptive bit rates, the payload is of variable size, but the creation interval is constant.

Regarding voice, one voice frame and one RTP/UDP packet is preferably delivered in a single IP packet, and it follows about 20 ms inter-arrival time. However, it is optionally possible to aggregate more than one voice frame, say two or four even up to eight voice frames to a single IP packet. However, aggregation like this makes the payload more vulnerable to packet loss and more sensitive to delays compared to a single voice frame per IP packet transmission.

The size of allocation (over the air interface) that each voice packet requires per 20 ms arrival instant depends, in addition to the voice frame length, on the length of the IP, UDP, RTP and such headers, on the IP header compression scheme and its header compression state. If no compression is applied, the overhead is several tens of bytes per voice frame and is thus excessive. Header compression will reduce the overhead to minimum possible at each instant. The compression result also depends on the checksum fields applied on different protocol layers, because checksums do not compress away. Further, at some transmission instants, some reverse flow header compression ACK may add to the compressed forward flow headers. The compression is able to handle IPv4 and IPv6 and further UDP and RTP protocols. Header compression means are specified in RFC3095 (ROHC) and RFC2507.

In Internet, there are versatile implementations of voice codecs, which may provide uncompatible formats and frame structures. The voice quality of such codecs over a communication link is typically lower than voice quality of AMR and AMR-WB codecs. The AllocationTable allows delivery of any voice format by allowing variable payload length be allocated.

Regarding audio coding, there exist several codecs and codec settings. There are MPEG players (for example, MPEG2 layer II, MPEG2 layer III, and MPEG4), Media players, MP3 players and such. They sample and create frames for the full audible band up to 64 kHz, whereas voice codecs often code only the voice band up to 4 kHz or up to 8 kHz. The audio frame length is defined by the audio codec specification. Typically, each audio frame contains a constant number of samples. This will result audio frame creation interval, which is typically of orded somewhat above 20 ins (depends on the audio codec). One audio frame is typically inserted into one RTP packet. If the amount of audio frame information is above the Maximum Transmission Unit (MTU) packet size, multiple RTP packets will be created. RTP time stamp uniquely describes timing of audio frames. In some exceptional cases, samples from more than one time stamp period may be collected to the same RTP packet, for example, if the payload of each frame is very small. For this situation, there are special time stamp creation rules. For an audio decoder, there exist bit buffers at the input of the decoder and also play-out buffers, which do some traffic smoothing.

For video transmission, several codecs and coding settings are valid. Quite typically a single picture is created in 40 ms intervals, as 25 pictures per second is enough to hide discontinuity of moving video from the user. For creation of a picture frame of video transmission, there are diverse types of coding algorithms. Sometimes a picture with full information is delivered, sometimes a differential picture is formed and delivered. The amount of information thus varies a lot from one picture coding interval to another interval. The picture is delivered in number of variable length packets per picture coding interval. For a video decoder, there exist bit buffers at the input of the decoder and also play-out buffers, which do some traffic smoothing.

As the created video frames are typically carried in IP packets, there are various routing paths and load conditions over the networks, which will cause delay and delay jitter to the packet arrival process at the base station buffers for downlink traffic. In the terminal, the packet creation process to the transmitter buffer has much less delay jitter as packets do not traverse through the network before getting uplink allocation. In the downlink, the base station knows the buffer status and may make optimal and precise allocations of resource units at each frame time into the AllocationTable. In the uplink, the buffer status is not known by the base station, which announces the allocations. Here, terminal has to signal its buffer status, request for an amount of allocation or has to allow base station to allocate some nominal amount of resource units, which the terminal may then use and indicate further how much more consequent allocation is needed.

For this allocation method, known characteristics of the traffic flows give an opportunity for the terminal not to decode AllocationTables at all time instants when they appear. If the terminal has an active traffic source of voice/audio/video/data, it may be reserved an allocation approximately every inter-arrival time periods of times. Say, AllocationTable announced that the terminal has a voice packet to receive, the terminal will receive the packet for decoding. So, if the previous allocation was at SFN, the next AllocationTable to decode will appear determinedly at SFN+Transmission Time Interval (TTI) and the terminal knows that for this voice service traffic flow, it need not decode any of the AllocationTables until The TTI has elapsed, that is at AllocationTable_SFN+TTI.RL ID.

As discussed also above, because of the delay jitter it may happen that the packet arrived to the base station buffer already before the inter-arrival time or did not yet arrive. In the first case, the base station will just delay the packet a little and will create the AllocationTable_SFN+TTI.RL ID allocation indicator at the proper time instant and allocate resource for the packet respectively. The cost of delaying this early packet is not large and it does not harm much. In the second case, there is no packet to deliver and the base station need not have that RL ID present in the AllocationTable. However, the terminal needs to do more frequent reception of the AllocationTable, as the packet may arrive at any instant after the inter-arrival time elapsed. If in this case, the terminal would wait for another TTI, the packet that arrives soon after the first TTI elapsed, would be too much delayed and the inter-arrival process would be disturbed.

After the skip of one TTI, if there is no downlink data to be allocated, the base station could inform the terminal, how it has to follow decoding the AllocationTables. There are several ways of implementing this. The terminal could know apriori interval for following say every 4th or 8th AllocationTable after the TTI elapsed. Then it is determined that resource allocation will happen as soon as possible in any of the AllocationTables in that sequence. After the allocation was active, new inter-arrival waiting time will be activated for the next packet arrival. Here, the inter-arrival time is activated based on the expected inter-arrival time so if there is jitter, each new TTI waiting time is activated based on the inter-arrival time plus the expected previous inter-arrival to compensate delay jitter in the expected value as much as possible. (Any Expectation Value Technique May be Applied.)

It is appreciated that several variants may be tailored for transmitting data based on TTI. The natural inter-arrival time may be reduced somewhat to start decoding AllocationTables for possible allocations in case of early arrival. Another variant is that AllocationTable allocation opportunity is reserved at the frequency of for example two times or four times the expected inter-arrival times. This allows delayed packets still be delivered in timing requirements. It will also allow time for physical layer retransmissions, which are important to increase the probability of correct decoding by recovering packets that corrupted during the first transmission by incremental redundancy, by retransmitting replicas or by soft-combining.

Figure 6:
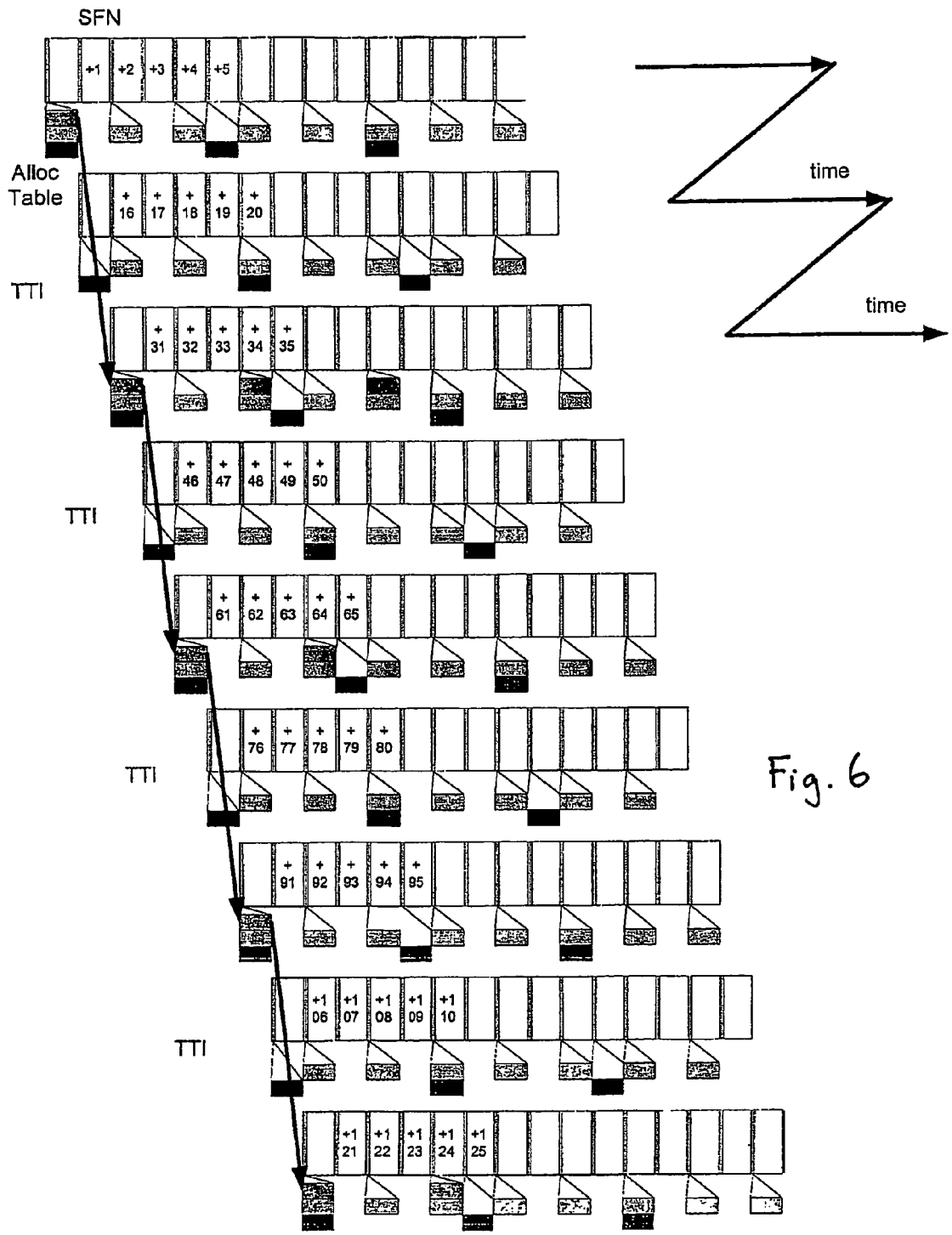
FIG. 6 shows, as an example, allocation for three terminals having different types of traffic, two terminals having intense short term allocations and one terminal having rare but regular long term allocations.

FIG. 6 relates to a combination of short-term and long-term allocation rules for three terminals. The allocation rule may include definitions for a short-term allocation and for a long-term allocation separately. The long-term allocation rule may be tied to an expected TTI, which is typically a very long period compared to the frame. In the AllocationTable after the TTI, if the allocation is empty (that is, data was not available for transmission in the buffer), the terminal and the base station will start following the short-term rule. This could mean that the allocation opportunity would appear, say every SFN %4 AllocationTable offsetting by offset{x}. The terminal will thus continue decoding the AllocationTables until it received a packet. If there is no continuum announced in this packet and if the terminal decodes it correctly, it can again switch to the long-term allocation rule. This means, it will decode the next AllocationTable at the expected TTI announced by the long-term allocation rule. Long-term allocation rule is illustrated in FIG. 6. Short-term allocations are shown in the same Figure. For the first terminal (marked with white blocks) there is a long-term allocation interval of TTI, accompanied with short-term allocations for excess data and retransmissions. For the second terminal (marked with blocks having a lighter shade of gray), there are only short-term allocations, regularly in every second frame. For the third terminal (marked with dark gray blocks), there are also only short-term allocations, regularly every fourth frame.

Figure 7B:
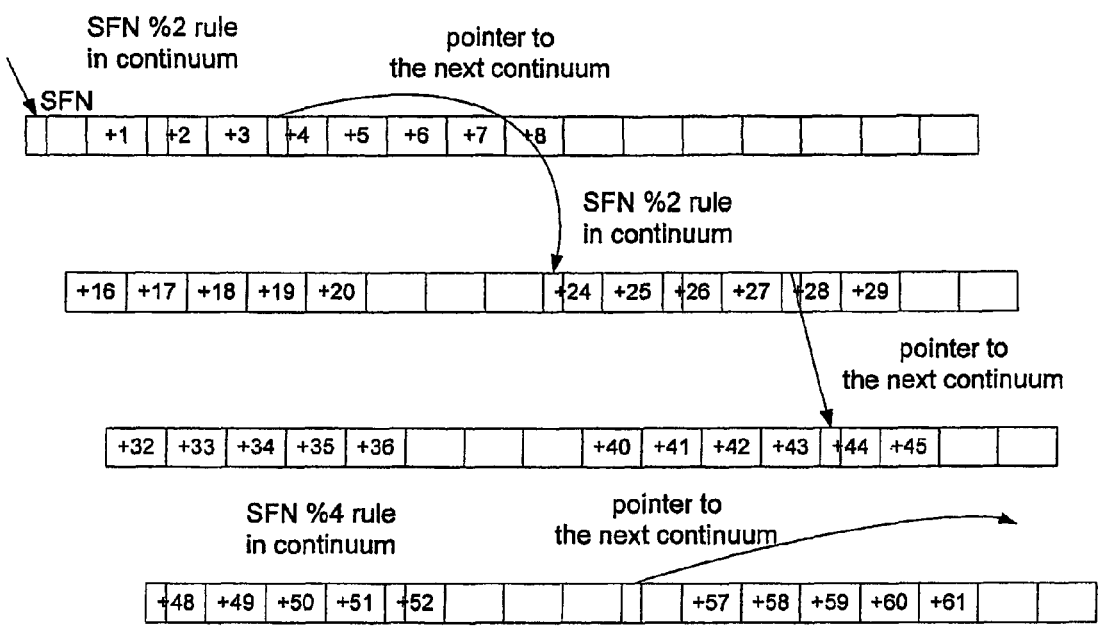
FIG. 7b shows, as an example, frames allocated using a continuum allocation rule.

After any allocation and reception of packets, there may be a continuum announced. In other words, the allocation is announced to continue until, for example, the full transmission buffer is emptied. This continuum may be indicated to follow immediate every frame rule or may follow the short-term allocation rule. Another embodiment is to postpone this continuum and have dedicated signalling to point, where (in which SFN) the continuum starts (see FIG. 7a). The continuum may thus nicely be extended by dedicated pointing, which always shows the start of the next piece of continuum. FIG. 7b shows, as an example, frames allocated using a continuum allocation rule. In the first continuum shown in FIG. 7b, the terminal monitors allocation information of every other frame. In frame SFN+4, there is a pointer to frame SFN+24 and, optionally, short-term rule defining that every other frame is monitored in the next continuum. The presence of the short-term rule for the next continuum is not mandatory, if the terminal knows that it applies the same short-term rule until otherwise told. In frame SFN+27, there is again a pointer to frame SFN+44 and a new short-term rule defining that allocation information of every fourth frame is to be monitored.

If a packet was allocated but is not properly decoded, there will be retransmissions of the packet. This may happen either by adding incremental redundancy or by retransmitting replicas of the packet or part of the packet. The base station will get to know the retransmission need of a downlink packet by the terminal acknowledgement. The retransmission will be indicated by the short-term allocation rule. So, for each TTI, a long-term allocation rule is followed and after each TTI a short-term allocation rule is followed, until all data is correctly received. After this period the long-term allocation rule is again respected so that the expected TTI is calculated without jitter, without allocation continuum and without retransmissions. There is of course a requirement that both the base station and the terminal calculate or know the TTI in precisely the same way.

The criteria for assigning allocation rules are discussed next. Any terminal may have several Layer 2 services active simultaneously and it has to receive different types of packet traffic flows, which have different characteristics. Thus, terminal should get active at any time, when any of its traffic flow requirements so determine. As there is flexibility for some traffic flows, for example, non-delay sensitive data services, it may be possible to coordinate their allocation for a single terminal. The base station may arrange most favourable timing constraints for all traffic flows of a terminal so that it will receive packets in a tight (continuous or very frequent) allocation as a burst and will then sleep till the next occurrence of a burst. Sometimes, the types of traffic flows do not allow this kind of coordination and each have to be followed at intersecting inter-arrival times.

The base station may have various optimization criteria for assigning allocation rules. It can monitor the buffer status of each traffic flow for every terminal and adjust the allocation rules. If there are non-delay sensitive packet flows, they can be used to smooth cell load. The base station will first of all take care of satisfying very delay sensitive traffic and real-time traffic rules. Non-real time traffic is more flexible in allocation timing. If there is less load in the system, the base station may divide the non-delay sensitive traffic load for any given allocation table split, say evenly for SFN %4 allocation. If the load or interference conditions get worse, the base station may easily modify the allocation rule for this non-delay sensitive traffic load to follow say SFN %8, SFN %16, SFN %32 or SFN %64 rule and so forth. All this may happen without modifying the allocation rules for delay sensitive or real-time traffic flows. Changing any rules may happen by the Radio Resource Control (RRC) signalling, as described in section 2. The modifications of short term allocation rules could actually be applied through the AllocationTable as well, as signalling such activation rules is not excessive bit load.

FIGS. 8a to 8e show, as examples, various tables relating to keeping track of allocation rules in a base station and in a terminal. A terminal may have any combination of short-term and long-term rules assigned to it. As discussed above, (combinations of) allocation rules may be terminal-specific or connection (traffic flow) specific. Information about the next continuum may be kept in the same table respectively.

Table 1 in FIG. 8a is an example of a base station table for allocations. In Table 1, the base station and UE1 have one traffic flow, which follows a short-term rule (that is, one period for monitoring allocation information). The base station and UE 2 follow one short term rule and one long-term rule without using information about the expected TTIs. In this case, the short-term rule may be activated after the actual allocation in a frame defined by the long-term allocation rule is found. This way the base station, once it decided to transmit data and indicated the start of transmission by allocating a part of frame defined by the long-term rule, may transmit data to terminal UE2 using allocations defined by the short-term rule. The base station and UE3 follow a different long-term rule for traffic flow 1 and traffic flow 2, but they follow a single common short-term rule. As the TTI is defined for both long-term rules, the short-term rule is activated if no allocation is found in a frame defined by the long-term allocation rule in order to cope with delay jitter.

Table 2 in FIG. 8b is a further example of a base station table for allocation. Table 2 shows numeric examples relating to allocation rules. The first terminal with RL ID 102 monitors frames with 20 ms (which is equal to 30 SFNs, when the frame length is ⅔ ms; this example is used widely in the numerical examples in this description) period in accordance with the long-term rule. If information is received and decoded correctly, this terminal continues with the long-term rule. If information is received but decoded incorrectly, there is need for retransmissions and this terminal thus monitors every fourth frame in accordance with the short term rule, typically until the information is received and decoded correctly.

As Table 2 shows, the second terminal having RL ID 41 monitors frames with 40 ms (60 SFNs) period in accordance with its long-term rule. The second terminal monitors also every sixteenth frame in accordance with its short-term rule. Conditionally, if the decoding of received information fails in connection with the frame defined by the long-term rule, a further short-term monitoring period is defined (every fourth frame).

As Table 2 shows, the third terminal having RL ID 743 uses a continuum allocation rule for monitoring allocation information. The notation SFN+100 means that the last frame of the previous continuum contained a pointer to skip 100 frames. The allocation rule of the third terminal thus identifies one specific future frame.

Tables 3 and 4 relate to Table 2. Table 3 in FIG. 8c is the allocation table of the first terminal with RL ID 102. Table 4 in FIG. 8d is the allocation table of the second terminal with RL ID 41. Table 5 in FIG. 8e, in turn, is an example of an allocation table of a terminal having connections to more than one base station. Table 5 lists a connection to a first base station, where the terminal is associated with RL ID 41, and a connection to a second base station, where the terminal is associated with RL ID 657. The long-term and short-term rules relating to these base stations are in this example identical. This relationship with more than one base station (sector, cell) for example refers to a handover; fast hard-handover, soft-handover, or alike.

Regarding handovers, if the terminal moves to another new cell, the base station knows that the terminal does not listen to the AllocationTable in the old cell any more. The base station will release this allocation rule commitment and will assign that space for another terminal. If the handover happens between sectors of the same base station, the base station may keep (hand over) also the preferred commitment for a signalling occurrence in the AllocationTable of the new serving cell. The allocation in the new sector will not be guaranteed. Anyway, the RL_ID will change and even SFN may change during the handover.

The allocation rules discussed above may be called active DRX rules and/or active DTX rules and or active DTX/DRX rules. After the traffic activity is over, there may still be another exponential DRX rule to change from the active state to the idle state. The idle state and active state DRX mechanisms may thus be different. The Idle state DRX rules may follow a well-known exponential depth sleep algorithm. The state transition between the active state DTX/DRX and idle state DRX is described next.

The active state DTX/DRX occurs based on known or assumed discontinuity, for example based on TTIs and on longer term pointing capability. In the idle state DRX, exponential rules may apply. As long as the DTX/DRX follows some traffic pattern or discontinuity up to the longest supported TTI, say 40 ms or 80 ms (or up to even 100 or 200 ms), active state DTX/DRX rules may be applied. Also any pointing to the next continuum will keep the terminal in the active state. If there is no activity within this period of time, the UE enters the exponential sleep of the idle state. In other words, the opportunity to receive paging is arranged so that the UE will decode the AllocationTable after; 80 ms, 160 ms, 320 ms, 640 ms, 1280 ms, 2560 ms, 5120 ms (up to the longest idle state DRX). So, exponentiality is applied in state transition to the idle state.

Figure 9A:
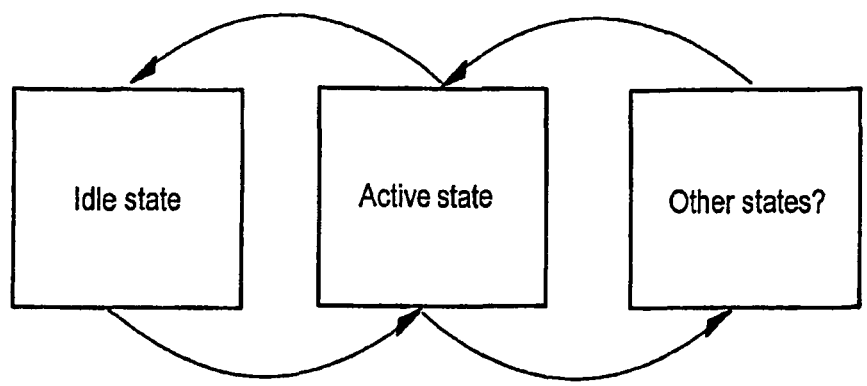
FIG. 9a shows schematically idle and active states and transitions between the states.
Figure 9C:
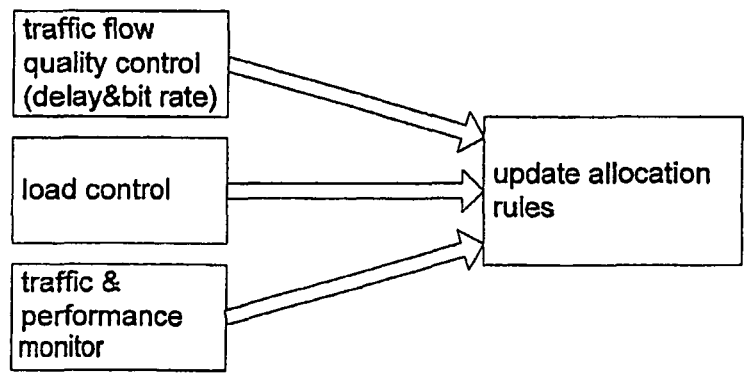
FIG. 9c shows possible triggers for allocation rule updates or for DTX/DRX rule updates.
Figure 9B:
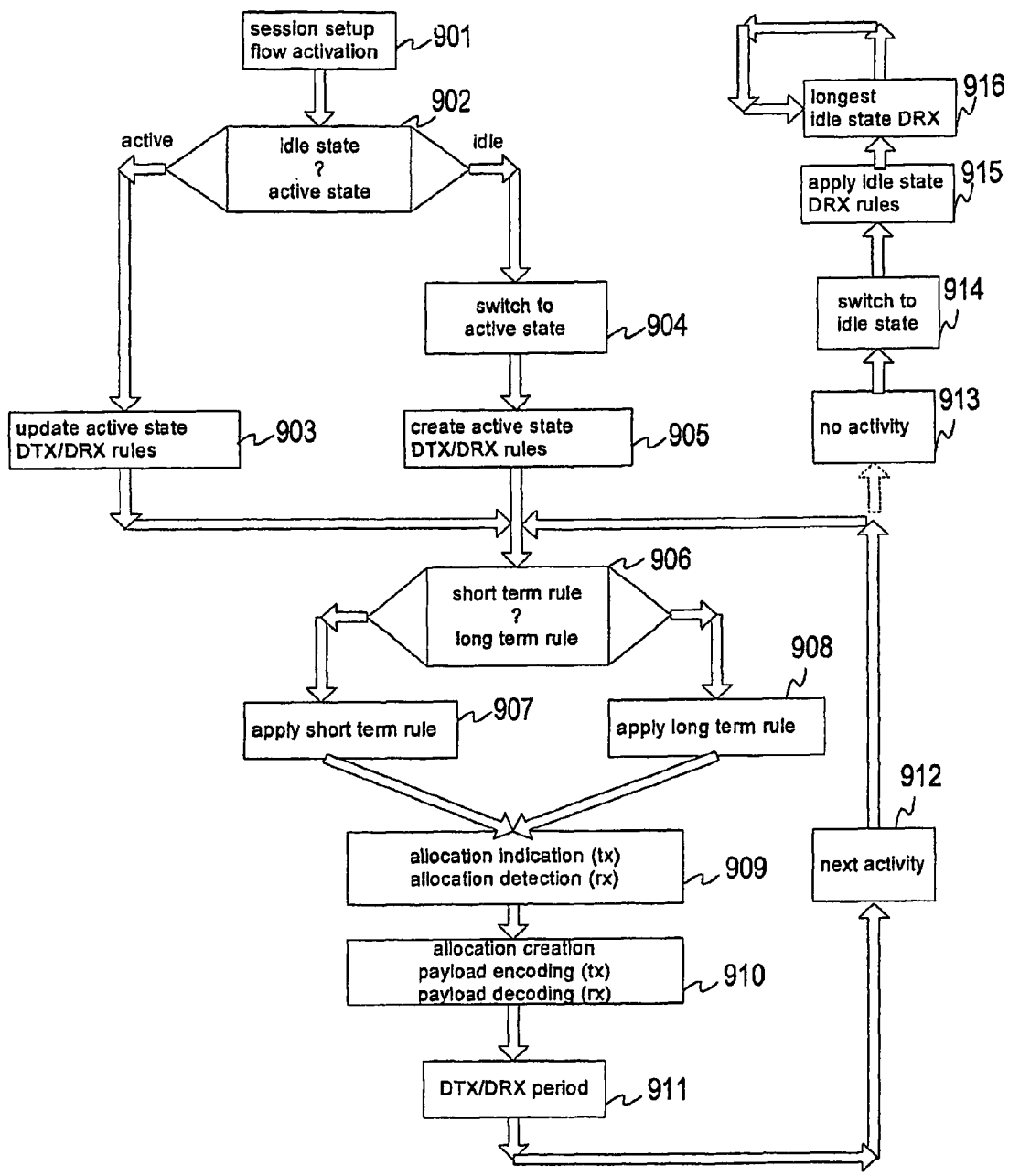
FIG. 9b shows a state diagram for the active state DTX/DRX allocation rules.

FIGS. 9a, 9b and 9c relate to transition from the active state DTX/DRX to the idle state DRX. FIG. 9a shows a state diagram, which shows the idle state and active state, and possibly some other states. The idle state DRX rules are different from the active state DTX/DRX rules.

FIG. 9b is a state diagram for the active state allocation rules in a communications device. In step 901, a session is set up or data flows are activated. In step 902 it is checked whether the communications device is in an idle state or in an active state. If the communications device is in an active state, the DTX/DRX active state allocation rules are updated in step 903 in accordance with the new session or newly activated data flows. If the communications device is in an idle state, it switched itself into an active state in step 904 and creates active state DTX/DRX rules in step 905. Thereafter the communications device repeats steps 906 to 912 until there is no data transmission for a predefined period of time (step 913). In step 906, the communications device determines whether it needs to follow a short-term allocation rule (step 907) or a long-term allocation rule (908). The communications device determines the length of the next DTX/DRX allocation period after the current frame accordingly. In step 909, the communications device monitors allocation information for determining whether it needs to receive data in the current frame. The communications device also determines whether it has a need to transmit data and to indicate this need in step 909. In step 910, the communications device encodes the payload to be transmitted and/or decodes the payload allocated to it, if any. In step 911, the communications device allows the rest of the duration of the DTX/DRX allocation period to pass. The next activity in step 912 refers to data to transmit and/or receive in the next period of DTX/DRX. If there is no activity during the longest addressable active state DTX/DRX, the communications device switches to the idle state in step 914. In step 915, the communications device starts to apply idle state allocation rules. In step 916, if there is no activity, the communications device has taken into use the longest idle state period. When there is activity after step 914, the communications device continues from step 901.

FIG. 9c is an illustration of possible triggers for allocation rule updates or for DTX/DRX rule updates. These triggers may apply in the base station for a given terminal or more commonly to more terminals, or these triggers may apply in the terminal. Load triggers are typically network originated, other triggers may be network or terminal originated. The rules themselves will apply equally in the base station for a given terminal and in the terminal respectively.

FIG. 10b shows an example, where a piece of allocation information may refer to more than one set of uplink transmission resources. The upmost line in FIG. 10b shows downlink DL frames and their system frame numbers SFN. The four rows below show uplink frames of four terminals UE1, UE2, UE3 and UE4. In this example, allocations tables are transmitted in connection with the downlink frames. Terminals UE1, UE2 and UE3 monitor allocation tables in accordance with an allocation rule of SFN mod 4. The time period between two subsequent allocation tables monitored by UE1, UE2 and UE3 is shown with arrow k1 in FIG. 10b. Terminal UE4 monitors allocation tables in accordance with an allocation rule of SFN mod 6; the respective time period is shown in FIG. 10b with arrow k2;

In the example of FIG. 10b, the terminals UE1, UE2 and UE3 have enough processing capability to allow them to use the uplink frame i+1 when allocation table in transmitted in a downlink frame i. Consider, for example, the allocation table of downlink frame SFN+4. This allocation table refers to uplink frames SFN+5; this is shown in FIG. 10b with dashed lines. Terminal UE4 has less processing capability, and the allocation table entries associated with UE4 refer to uplink frames i+2. For example, the allocation table entry in the downlink frame SFN+5 refers to uplink frame SFN+7.

It is appreciated that although FIG. 10b shows that all uplink frames in accordance with the allocation rules SFN mod 4 (UE1-UE3) and SFN mod 6 (UE4) contain transmission resources allocated for terminals UE1-UE4, this is just an example.

Some of the uplink frames in accordance with the respective allocation rules might not contain resources allocated to terminals UE1-UE4. FIG. 10b does not give details about the downlink transmission resources allocated to UE1-UE4 in the downlink transmission frames.

The resource allocator in the communications system should take into account the different capabilities of terminals. Consider, for example, FIG. 10b. In frame SFN+4 the allocations of UE1-UE3 are decided simultaneously for UL frame SFN+5. In frame SFN+5, the allocation of UE4 is decided for UL frame SFN+7. However, when the allocation rules allow allocations in the same frame, for example in frame SFN+13, the allocation of UE 4 is indicated already in downlink frame SFN+11, whereas the allocations for frame SFN+13 for UE1-UE3 is indicated in SFN+12. Thus, the resource allocator should take care that all the allocations of a given uplink frame are optimal, even if signalling of this allocation happens earlier for slow processing capable UEs than for fast processing capable UEs.

FIG. 12a shows schematically examples of allocation tables 1210, 1220, which contains also uplink acknowledgements. The allocation tables 1210, 1220 relate to two consecutive uplink frames (namely frame 1 and frame i) associated with a specific allocation rule. In the example in FIG. 12a, terminals UE1-UE4 monitor allocation tables and uplink acknowledgements in accordance with the specific allocation rule. The allocation table 1210 relating to uplink frame 1 shows entries relating to the terminals UE1-UE4, indicating allocation of uplink transmission resources to these terminals. The allocation table 1220 relating to uplink frame i shows entries relating to terminals UE1-UE4 and uplink acknowledgements for terminals UE1-UE4. The uplink acknowledgements in allocation table 1220 relate to the uplink frame 1. As FIG. 12a shows, the order of the uplink acknowledgements is the same as the allocation table entries. It is thus possible to determine to which terminals the uplink acknowledgements relate based on the information in the allocation table entries. It is appreciated that typically the allocation tables 1210, 1220 contain information also about downlink allocations. The allocation table 1220 contains, as an example, also an uplink acknowledgement for a terminal UE5 to which there is no uplink entry in the allocation table 1220. The terminal UE5, however, monitors the allocation table 1220 in accordance with an allocation rule associated with UE5. A radio link identifier RLID(UE5) or other identifier associated with the terminal UE5 is transmitted together with the uplink acknowledgement.

FIG. 12b shows schematically a further example of allocation tables 1230, 1240 containing uplink acknowledgements relating to FIG. 10b. In the example shown in FIG. 10b, the terminals have different capabilities and the uplink entries in an allocation table may refer to more than one uplink frame. The allocation table 1230 is transmitted in connection with the downlink frame SFN+4 in FIG. 10b. The allocation table 1230 indicates the allocation of uplink transmission resources to terminals UE1-UE3 in uplink frame SFN+5 in FIG. 10*b* (see dashed lines in FIG. 10*b*). The allocation table 1230 also contains an entry indicating uplink allocation for a terminal UE5. This uplink allocation may relate to the uplink frame SFN+5 or to another uplink frame, depending on the capability of the terminal UE5. The allocation table 1230 also contains uplink acknowledgements for uplink information sent by terminals UE1-UE3 in the uplink frame SFN+1 in FIG. 10*b* (see also solid lines in FIG. 10*b*). The allocation table 1230 may contain further entries and acknowledgements.

The allocation table 1240 is transmitted in connection with the downlink frame SFN+5 in FIG. 10*b*. This allocation table 1240 contains uplink entries relating to terminals UE6-UE8 and UE4. The uplink resources allocated for terminal UE4 are in the uplink frame SFN+7. The uplink resources allocated for terminals UE6-UE8 may be in other uplink frames than SFN+7, depending on the capabilities of these terminals UE6-UE8. The allocation table 1240 contains also uplink acknowledgments for the terminals UE6-UE8 (relating to their earlier uplink transmissions) and uplink acknowledgement for the terminal UE4. The uplink acknowledgement for UE4 in the allocation table 1240 relates to the uplink transmission in the uplink frame SFN+L in FIG. 10*b*, as indicated by the solid line in the figure.

Regarding the downlink frames SFN+8 and SFN+12 in FIG. 10*b*, an allocation table similar to the allocation table 1230 is transmitted in these downlink frames with respect to entries and acknowledgements relating to the terminals UE1-UE3. In the downlink frame SFN+8 or SFN+12, the allocation table need not contain entries or acknowledgements relating to the terminal UE5. Regarding the downlink frame SFN+11 in FIG. 10*b*, the allocation table in this downlink frame contains an entry and acknowledgment for the terminal UE4 similarly as the allocation table 1240.

Figure 13:
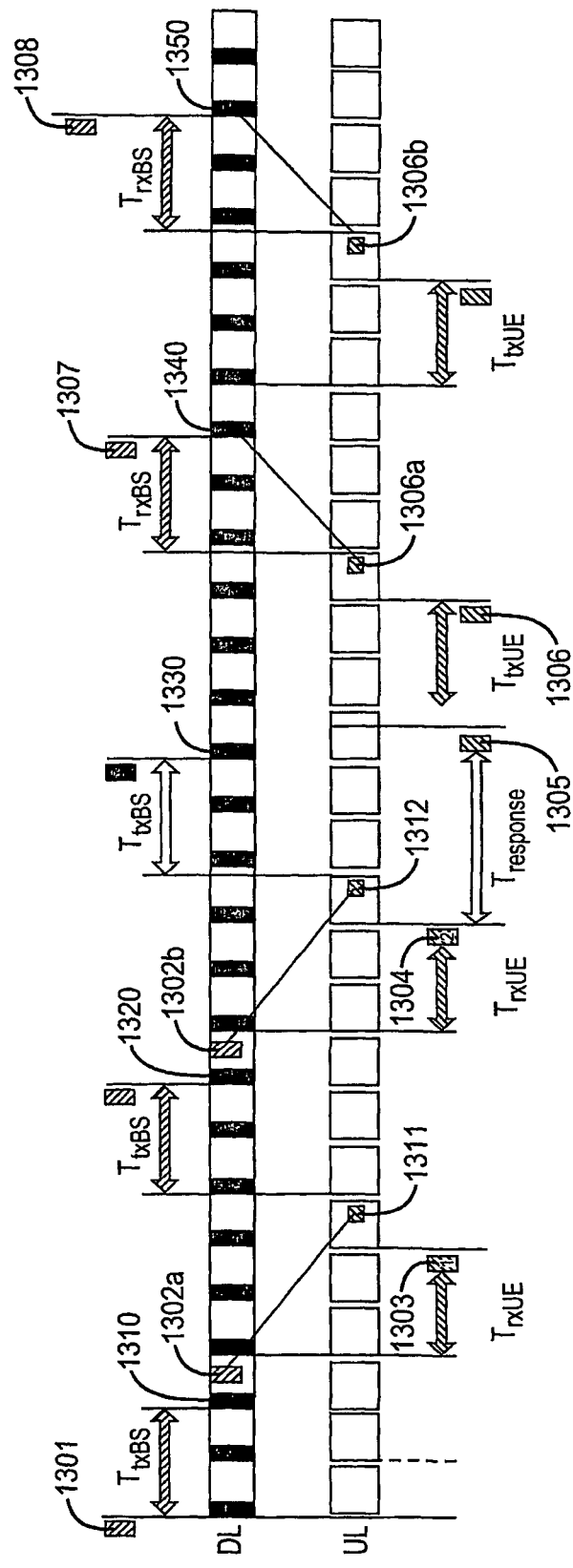
FIG. 13 shows schematically a roundtrip graph of a downlink originated transmission with an uplink response, where the uplink acknowledgements are placed in the allocation table.
Figure 14:
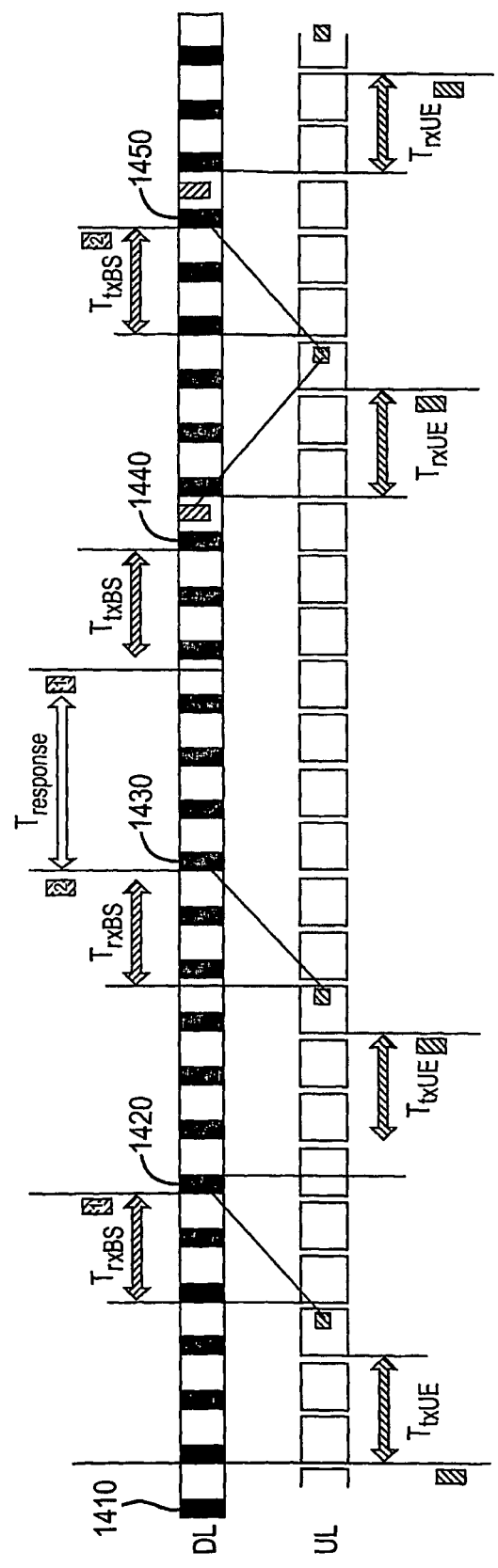
FIG. 14 shows schematically a roundtrip graph of an uplink originated transmission with a downlink response, where the uplink acknowledgements are placed in the allocation table.

The processing times in the terminals and network elements need to be taken into account when the period for discontinuous transmission/reception is determined. FIGS. 13 and 14 show examples and details on this. FIG. 13 shows schematically a roundtrip graph of a downlink originated transmission with uplink response, where the uplink acknowledgements are placed in the allocation table. In the example shown in FIG. 13, allocation table containing uplink and downlink allocation information is transmitted in the beginning of a downlink frame by the way of example. Similarly as in FIG. 10*b*, the frames can be associated with frame numbers SFN. The upper row in FIG. 13 shows downlink frames, and the lower row in FIG. 13 shows uplink frames of a terminal. The terminal UE follows every sixth allocation table 1310, 1320, 1330, 1340, 1350. It is assumed that uplink resources are allocated to the terminal UE in every sixth uplink frame.

In the upper left corner of FIG. 13 it is shown that a base station BS of the communications system receives a packet 1301 to be transmitted. After a processing time Toms the base station has encoded the packet and allocated resources for the packet. The base station may thus send the encoded packet 1302*a* in a first downlink frame whose allocation information the terminal UE monitors. The terminal monitors the allocation table 1310 and notices resources allocated to itself in the downlink and also in the uplink. It takes a time period of $T_{rxUE}$ for the terminal to process the downlink signal and to prepare an acknowledgement. In FIG. 13, $T_{rxUE}$ corresponds to the duration of two frames. Therefore the uplink allocation for the terminal UE in the allocation table 1310 (downlink frame SFN i) can refer at earliest to an uplink frame i+3, as the UL and DL frames are aligned in FIG. 13. In the example in FIG. 13, the received packet 1303 is erroneous. The terminal UE transmits a negative downlink acknowledgement 1311 using the allocated uplink resources. The base station BS receives the uplink signal and processes it in response to the negative downlink acknowledgement 1311, the base station resends the encoded packet 1302*b*. This packet 1302*b* may actually be the replica of the original transmission 1302*a* or an incremental redundancy version of it. This time the received packet 1304 does not contain errors. The terminal UE transmits a positive downlink acknowledgement 1312, using uplink transmission resource allocated to it in the allocation table 1320. The base station has received and decoded this positive downlink acknowledgement after $T_{rxBS}$, which is the time that the BS would require to create the next transmission, say the next packet ready for transmission may exist in the BS buffer already. This next packet is shown in FIG. 13, but details of transmission of this next packet are not shown in FIG. 13. The next packet could be transmitted using resources allocated, for example, in the allocation table 1330.

After receiving the packet correctly, the UE1 will prepare a response 1305. This will take a time of $T_{response}$. After this, the UE will encode the response. The UE is ready to send the encoded response 1306 after a time duration of $T_{txUE}$. The UE monitors the allocation table 1330 when it encodes the response 1305. When the UE transmits the encoded packet 1306*a* using resources allocated to it in the allocation table 1330, it takes a time duration of $T_{rxBS}$ after the end of the uplink frame for the base station to process the uplink signal and to decode the packet. The received packet 1307 is erroneous, and the base station sends a negative uplink acknowledgement in the allocation table 1340. It also allocates uplink resources to the terminal UE, which immediately after decoding the allocation table 1340 can start preparations for resending the encoded packet, a replica or an incremental redundancy version of it. The retransmission is marked with reference numeral 1306*b* in FIG. 13. After receiving the uplink signal, the base station processes the signal and correctly received packet 1308 can be send forward to further network elements after processing time of $T_{rxBS}$. A positive uplink acknowledgement for the retransmission 1306*b* is included in the allocation table 1350.

Considering the processing times in the base station and in the terminal in FIG. 13, it seems reasonable to associate with the terminal periodic allocation rules defining every Nth frame, where N is equal or greater than six. It is appreciated that the terminal UE may monitor also the other allocation tables than 1310, 1320, 1330, 1340 and 1350 in FIG. 13, if the allocation rules associated with the terminal UE so define.

FIG. 14 shows schematically a roundtrip graph of an uplink originated transmission with a downlink response, where the uplink acknowledgements are placed in the allocation table. Similarly as FIG. 13, FIG. 14 shows one retransmission in both the downlink and in the uplink direction. In allocation table 1410 in FIG. 14, UL resources are allocation for the UE. After a delay marked with $T_{txUE}$ the UE is ready to transmit an encoded packet. In FIG. 14, UL allocation for the UE in the allocation table 1410 refers to the frame where the packet is shown to be transmitted: The UL allocation of this UE in FIG. 14 thus refer 3 frames ahead. This 3 frames is the minimum time for UE having TRUE of two frame durations. The UL acknowledgment for the UL transmission is in the allocation table 1420. In the example in FIG. 14, the UL acknowledgement in allocation table 1420 is negative and the allocation table 1420 indicates UL resources for retransmission. After a successful UL retransmission, a positive UL acknowledgement is sent in the allocation table 1430. No further UL transmission resources are allocated for the UE in this example. In response to the successfully received data, the base station sends data to the UE by allocating in the allocation table 1440 DL resources for DL transmission and also UL resources for DL acknowledgment information. The first DL transmission in FIG. 14 is not successful, and the UE sends a negative DL acknowledgment using the allocated UL resources. Thereafter a DL retransmission occurs by allocating DL and UL resources using the allocation table 1450, similarly as in the allocation table 1440.

Above when referring to FIGS. 13 and 14, it was assumed that there is one periodic allocation rule. Alternatively, FIGS. 13 and 14 may be considered to shows an example relating to a combination of a long-term rule and a short-term rule. The allocation tables relating to the long-term rule are 1310, 1330 and 1350 and 1410 and 1440. The allocation table 1320 is monitored due to a short-term allocation rule triggered on by the DL allocation in the allocation table 1310 for the transmission of packet 1302a. The allocation table 1340 is monitored due to the UL allocation in the allocation table 1330 for the transmission of packet 1306a. Allocation tables 1420 and 1430 are monitored in response to the UL allocation in the allocation table 1410. The allocation table 1450 is monitored in response to the DL allocation in the allocation table 1440.

Similarly as for DL transmission, it is thus possible to have for the UL allocations a long-term rule for new transmissions, and a short-term rule which is followed in response to an UL transmission. Following an UL allocation according to a long-term allocation rule (when the UE listens to, for example, every $16^{th}$ SFN), and a transmission utilizing this UL allocation, a short-term allocation rule starts immediately to work. Thus the UE starts listening to the allocTable more often than before. The short-term allocation may be for example SFN+4. Thus after an UL allocation in SFN, and a UL transmission by UEx in SFN, UE listens to the AllocTable in SFN+4, where the acknowledgment for the UL transmission in SFN is transmitted, together with possibly a new UL allocation for a retransmission (retransmission refers also here to a retransmitted replica of the original transmission or to an incremental redundancy version of the original transmission).

A further simplification would follow if one single short-term allocation rule is specified for all UEs. In other words, only one terminal capability class is assumed for the UEs. Then all the acknowledgments of the UL transmissions in a specific SFN would come for example in a DL frame SFN+m, where m is the period associated with the short-term allocation rule. This way the UL acknowledgments would not need any specification indicating which UE they are related to. The ordering of the UL acknowledgments in an allocation table of SFN+m would follow directly from the ordering of UL resources to UEs in allocation table of SFN.

It would of course be sensible if the short-term allocation rules for DL retransmissions and the short-term allocation rules for UL acknowledgments and possible UL allocations for retransmissions would be the same. This would require that the UL allocations that are indicated in SFN are for such UL resources that there is sufficient time for the UE to decode the possible DL transmission in SFN. Then the operation would be such that in SFN, a DL transmission in SFN is indicated, together with possibly an UL allocation in SFN+$UL_{delay}$. For example, the allocation table 1410 could indicate a DL transmission in addition to the UL allocation. In the allocated UL resource in SFN+$UL_{delay}$, the UE transmits possible UL data, and a possible acknowledgment for the DL packet. Referring again to FIG. 14, this would be the first transmission from the UL. In SFN+m (allocation table 1420 in FIG. 14), the base station allocates a possible retransmission of the DL packet (if the UE transmitted negative acknowledgment in SFN+$UL_{delay}$), a possible acknowledgment of the UL packet (if there was an UL allocation in SFN which was used in SFN+$UL_{delay}$), and a possible allocation for UL retransmission (if there was a negative UL acknowledgment). In SFN+m+$UL_{delay}$, the UE again transmits a possible DL-acknowledgment and a possible UL retransmission (the second UL transmission in FIG. 14). At SFN+2m (allocation table 1430 in FIG. 1430), the BS again transmits a possible DL retransmission a possible UL acknowledgement and a possible allocation for a UL retransmission. This goes on until both UL and DL packets are positively acknowledged, after which the UE goes to sleep and wakes up in time to listen to allocations in accordance to the long-term allocation rule.

Figure 15:
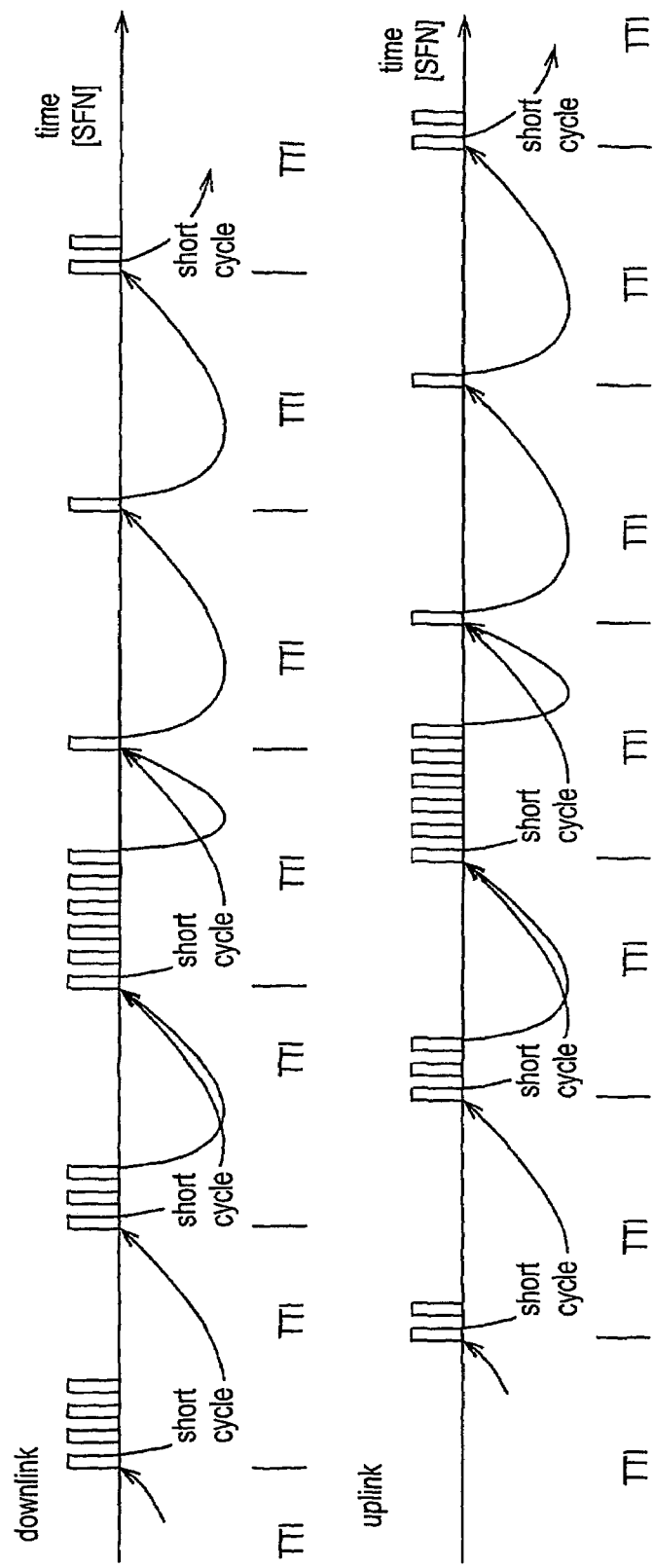
FIG. 15 shows schematically an example relating to a combination of long-term and short-term allocations rules.

FIG. 15 shows schematically a further example relating to a combination of a long-term and short-term allocation rules. The period of the DL and UL long-term allocation rules is marked in FIG. 15 with TTI. The upper part of FIG. 15 relates to downlink transmission, and the lower part of FIG. 15 relates to uplink transmission.

It is appreciated that the term allocation information may refer to a piece of information transmitted in connection with the set of transmission resources whose allocation to communications devices the allocation information specifies. As an example, consider an allocation table in the beginning of a frame or a header in a data packet/block. Allocation information may alternatively refer to a piece of information transmitted separately from the transmission resources whose allocation the allocation information specifies. As an example, uplink allocation information is transmitted in the downlink direction. Uplink allocation information may be transmitted together with downlink allocation information.

It is appreciated that allocation information may be an allocation table listing identifiers of communications devices and the transmission resources allocated for the communications devices. The allocation table may, but need not, list the transmission resources allocated to the communications devices explicitly, or use some coding system instead.

It is furthermore appreciated that there may be a timing offset between a set of downlink transmission resources (for example, a downlink frame having a specific frame number) and a corresponding set of uplink transmission resources (for example, an uplink frame having the same frame number). Such a timing offset does not have impact to the allocation and/or acknowledgement schemes described above.

It is appreciated that the term communications device refers here to any communications device capable of communicating via a communications system. Examples of communications devices are user equipment, terminals, mobile phones, mobile stations, personal digital assistants, laptop computers and the like. Furthermore, a communications device need not be a device directly used by human users. Furthermore, a communications device may be a composition of several devices.

It is appreciated that the term monitoring allocation information refers to the functionality the communications device carries out for being able to determine whether a specific piece of allocation information indicates that this communications device is being allocated transmission resources in the respective set of transmission resources. Typically a communications device receives symbols where the allocation information signalling bits are carried in a channel coded format, and the communications device decodes the channel coding of those symbols. Thereafter the communications device interprets the meaning of the allocation information signalling bits and behaves respectively. This is one example of the functionality that the term monitoring intends to cover. A more detailed example is given above in connection with the second embodiment of the invention.

It is appreciated that the functionality to support embodiments of the invention in the communications device and in the communications system may be provided as software, hardware or a suitable combination of software and hardware. It is appreciated that a computer program in accordance with an embodiment of the invention may be embodied on a record medium, stored in a computer memory or carried on an electrical carrier signal.

It is appreciated that the features defined by the appended dependent claims may be combined to form further combinations.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
defining at least one allocation rule for associating at least one sequence of sets of transmission resources with at least one communications device, the at least one communications device being configured to monitor allocation information in accordance with a set of allocation rules associated with the respective communications device;
informing the at least one communications device of the at least one allocation rule;
transmitting allocation information in accordance with the at least one allocation rule for indicating allocation of sets of transmission resources; and
allocating transmission resources for the at least one communications device based at least on the at least one allocation rule;
wherein said step of defining comprises defining at least one allocation rule which defines that the at least one communications device monitors the allocation information at least periodically using a first period;
wherein said at least one allocation rule further defines that the at least one communications device monitors the allocation information periodically using a second period, which is shorter than the first period;
wherein said at least one allocation rule further defines that the at least one communications device conditionally monitors the allocation information periodically using the second period;
wherein said at least one allocation rule defines that the second period is used on one of the following conditions:
the allocation information monitored using the first period does not indicate transmission resources allocated to the at least one communications device until the at least one communications device determines transmission resources allocated to at least one communications device,
the allocation information monitored using the first period indicates the start of transmission resources allocated to the at least one communications device until the allocation information indicates no more transmission resources allocated to the at least one communications device, and
information carried by the transmission resources associated with the first period is erroneously received by the at least one communications device wherein the second period is used for retransmissions until a positive acknowledgment is received.

2. A method as defined in claim 1, wherein said first period comprises one of a time period and a number of the sets of transmission resources.

3. A method as defined in claim 1, comprising sending information relating to the allocation rules to said at least one communications device.

4. A method as defined in claim 1, comprising receiving information relating to the allocation rules from at least one of said at least one communications device.

5. A method as defined in claim 1, comprising transmitting the allocation information associated with the set of transmission resources with the set of transmission resources.

6. A method as defined in claim 1, comprising transmitting the allocation information with the set of downlink transmission resources wherein the allocation information is associated with one of the following a set of downlink transmission resources and a corresponding set of uplink transmission resources.

7. A method as defined in claim 1, wherein the allocation information of the set of transmission resources comprises at least one identifier associated with the at least one communications device.

8. A method as defined in claim 1, wherein the allocation information of the set of transmission resources comprises at least one identifier associated with at least one of a communications device and a group of communications devices.

9. A method as defined in claim 1, comprising defining allocation rules for a plurality of communications devices so that the plurality of communications devices monitor the same sets of transmission resources.

10. A method as defined in claim 1, comprising adjusting said at least one allocation rule depending on at least one of a transmission load, changing allocation needs, a traffic type, traffic flows, device capability, bit rate requirements, delay requirements, and buffering requirements.

11. A method as defined in claim 1, comprising transmitting uplink acknowledgement information in connection with transmitting the allocation information in accordance with said at least one allocation rule.

12. A method as defined in claim 11, wherein the uplink acknowledgement information relates to a first set of uplink transmission resources associated with a first allocation rule and the uplink acknowledgement information is transmitted in connection with allocation information referring to a second set of uplink transmission resources associated with the first allocation rule.

13. A method as defined in claim 12, wherein the allocation information referring to the second set of uplink transmission resources indicates allocation of transmission resources to the at least one communications device with which the uplink acknowledgement information is associated.

* * * * *